(12) United States Patent
Matsunaga et al.

(10) Patent No.: US 7,702,457 B2
(45) Date of Patent: Apr. 20, 2010

(54) PEDESTRIAN NAVIGATION SYSTEM, INFORMATION DELIVERY SERVER, AND PROGRAM

(75) Inventors: Takayuki Matsunaga, Chiyoda-ku (JP); Hiroshi Tojo, Chiyoda-ku (JP)

(73) Assignee: Navitime Japan Co., Ltd., Tokyo (JP)

( * ) Notice: Subject to any disclaimer, the term of this patent is extended or adjusted under 35 U.S.C. 154(b) by 574 days.

(21) Appl. No.: 11/632,146

(22) PCT Filed: Jul. 13, 2005

(86) PCT No.: PCT/JP2005/012953

§ 371 (c)(1), (2), (4) Date: Jan. 11, 2007

(87) PCT Pub. No.: WO2006/009044

PCT Pub. Date: Jan. 26, 2006

(65) Prior Publication Data
US 2007/0233372 A1 Oct. 4, 2007

(30) Foreign Application Priority Data
Jul. 15, 2004 (JP) .............................. 2004-208111

(51) Int. Cl.
*G01C 21/34* (2006.01)
(52) U.S. Cl. ........................... 701/209; 701/200
(58) Field of Classification Search ......... 701/200–202, 701/209, 205
See application file for complete search history.

(56) References Cited

U.S. PATENT DOCUMENTS

| | | | |
|---|---|---|---|
| 6,124,826 A * | 9/2000 | Garthwaite et al. .... | 342/357.09 |
| 6,226,590 B1 | 5/2001 | Fukaya et al. | |
| 6,490,522 B2 * | 12/2002 | Sugiyama et al. ........... | 701/211 |
| 6,681,176 B2 * | 1/2004 | Funk et al. .................. | 701/207 |

(Continued)

FOREIGN PATENT DOCUMENTS

DE 198 36 151 A1 3/1999

(Continued)

OTHER PUBLICATIONS

International Search Report of PCT/JP2005/012953, date of mailing Oct. 6, 2005.

(Continued)

*Primary Examiner*—Yonel Beaulieu
(74) *Attorney, Agent, or Firm*—Westerman, Hattori, Daniels & Adrian, LLP

(57) ABSTRACT

A pedestrian navigation system, an information delivery server, and a program for naturally guiding (such as speech-guiding) the user of a portable terminal at an intersection are disclosed. An information delivery server includes a map database containing data such as nodes including paths constituting intersections, links, and costs of the links, a path seeking section, an intersection path judging section for detecting a path passing through an intersection from guidance paths which the path seeking section has sought, a guidance point determining section which determines a guidance point for path guidance, a guidance data creating section which determines a guidance pattern of path guidance according to the guidance point, and a data delivering section for delivering map data, guidance path data, and guidance data to a portable terminal. The guidance point determining section selects a specific node out of all the nodes constituting intersections as a guidance point.

18 Claims, 15 Drawing Sheets

U.S. PATENT DOCUMENTS

| | | | |
|---|---|---|---|
| 2002/0103599 A1 | 8/2002 | Sugiyama et al. | |
| 2003/0158653 A1* | 8/2003 | Sakai | 701/205 |
| 2006/0241857 A1* | 10/2006 | Onishi et al. | 701/202 |
| 2008/0114534 A1* | 5/2008 | Yamazaki et al. | 701/201 |
| 2009/0037101 A1* | 2/2009 | Koike et al. | 701/209 |

FOREIGN PATENT DOCUMENTS

| | | |
|---|---|---|
| JP | 6-137880 A | 5/1994 |
| JP | 8-20265 B2 | 3/1996 |
| JP | 8-159803 A | 6/1996 |
| JP | 9-222331 A | 8/1997 |
| JP | 11-51674 A | 2/1999 |
| JP | 2001-165681 A | 6/2001 |
| JP | 2001-298765 A | 10/2001 |
| JP | 2002-228479 A | 8/2002 |
| JP | 2003-177029 A | 6/2003 |
| JP | 2003-207358 A | 7/2003 |
| JP | 2003-214860 A | 7/2003 |
| JP | 2004-45156 A | 2/2004 |
| JP | 2005-114694 A | 4/2005 |

OTHER PUBLICATIONS

Translation of the International Preliminary Report on Patentability of International Application No. PCT/JP 2005/012953, with Form PCT/IB/373 and Form PCT/ISA/237.

* cited by examiner

FIG.6A

| | LINK ATTRIBUTE | | | | | | |
|---|---|---|---|---|---|---|---|
| P1 | SHORT LINK | LONG LINK | | | | | |
| P2 | SHORT LINK | PEDESTRIAN CROSSING | LONG LINK | | | | |
| P3 | SHORT LINK | PEDESTRIAN CROSSING | SHORT LINK | LONG LINK | | | |
| P4 | SHORT LINK | PEDESTRIAN CROSSING | SHORT LINK | PEDESTRIAN CROSSING | LONG LINK | | |
| P5 | SHORT LINK | PEDESTRIAN CROSSING | SHORT LINK | PEDESTRIAN CROSSING | SHORT LINK | LONG LINK | |
| P6 | SHORT LINK | PEDESTRIAN CROSSING | SHORT LINK | PEDESTRIAN CROSSING | SHORT LINK | PEDESTRIAN CROSSING | LONG LINK |
| P7 | SHORT LINK | PEDESTRIAN CROSSING | SHORT LINK | PEDESTRIAN CROSSING | SHORT LINK | PEDESTRIAN CROSSING | SHORT LINK | LONG LINK |
| P8 | PEDESTRIAN CROSSING | LONG LINK | | | | | |
| P9 | PEDESTRIAN CROSSING | SHORT LINK | LONG LINK | | | | |
| P10 | PEDESTRIAN CROSSING | SHORT LINK | PEDESTRIAN CROSSING | LONG LINK | | | |
| P11 | PEDESTRIAN CROSSING | SHORT LINK | PEDESTRIAN CROSSING | SHORT LINK | LONG LINK | | |
| P12 | PEDESTRIAN CROSSING | SHORT LINK | PEDESTRIAN CROSSING | SHORT LINK | PEDESTRIAN CROSSING | LONG LINK | |
| P13 | PEDESTRIAN CROSSING | SHORT LINK | PEDESTRIAN CROSSING | SHORT LINK | PEDESTRIAN CROSSING | SHORT LINK | LONG LINK |
| P14 | PEDESTRIAN CROSSING | SHORT LINK | PEDESTRIAN CROSSING | SHORT LINK | PEDESTRIAN CROSSING | SHORT LINK | PEDESTRIAN CROSSING | LONG LINK |

FIG.6B

| | GUIDANCE PATTERN |
|---|---|
| P1 | GO RIGHTWARD SHORTLY |
| P2 | STRAIGHT AHEAD / GO OVER THE PEDESTRIAN CROSSING / GO RIGHTWARD SHORTLY |
| P3 | (STRAIGHT AHEAD / GO OVER THE PEDESTRIAN CROSSING) / GO STRAIGHT THROUGH (SHORTLY)(OR, NO GUIDANCE) |
| P4 | STRAIGHT AHEAD / GO OVER THE PEDESTRIAN CROSSING / FURTHER / GO OVER THE PEDESTRIAN CROSSING / GO RIGHTWARD SHORTLY |
| P5 | STRAIGHT AHEAD / GO OVER THE PEDESTRIAN CROSSING / FURTHER / GO OVER THE PEDESTRIAN CROSSING / GO STRAIGHT THROUGH SHORTLY |
| P6 | STRAIGHT AHEAD / GO OVER THE PEDESTRIAN CROSSING / FURTHER / GO OVER THE PEDESTRIAN CROSSING / FURTHER / GO OVER THE PEDESTRIAN CROSSING / GO RIGHTWARD SHORTLY |
| P7 | STRAIGHT AHEAD / GO OVER THE PEDESTRIAN CROSSING / FURTHER / GO OVER THE PEDESTRIAN CROSSING / FURTHER / GO OVER THE PEDESTRIAN CROSSING / GO STRAIGHT THROUGH SHORTLY |
| P8 | GO LEFTWARD / GO OVER THE PEDESTRIAN CROSSING / GO LEFTWARD SHORTLY |
| P9 | GO LEFTWARD / GO OVER THE PEDESTRIAN CROSSING / GO STRAIGHT THROUGH SHORTLY |
| P10 | GO LEFTWARD / GO OVER THE PEDESTRIAN CROSSING / FURTHER / GO OVER THE PEDESTRIAN CROSSING / GO LEFTWARD SHORTLY |
| P11 | GO LEFTWARD / GO OVER THE PEDESTRIAN CROSSING / FURTHER / GO OVER THE PEDESTRIAN CROSSING / GO STRAIGHT THROUGH SHORTLY |
| P12 | GO LEFTWARD / GO OVER THE PEDESTRIAN CROSSING / FURTHER / GO OVER THE PEDESTRIAN CROSSING / FURTHER / GO OVER THE PEDESTRIAN CROSSING / GO LEFTWARD SHORTLY |
| P13 | GO LEFTWARD / GO OVER THE PEDESTRIAN CROSSING / FURTHER / GO OVER THE PEDESTRIAN CROSSING / FURTHER / GO OVER THE PEDESTRIAN CROSSING / GO STRAIGHT THROUGH SHORTLY |
| P14 | GO LEFTWARD / GO OVER THE PEDESTRIAN CROSSING / FURTHER / GO OVER THE PEDESTRIAN CROSSING / FURTHER / GO OVER THE PEDESTRIAN CROSSING / FURTHER / GO OVER THE PEDESTRIAN CROSSING / GO LEFTWARD SHORTLY |

FIG.9
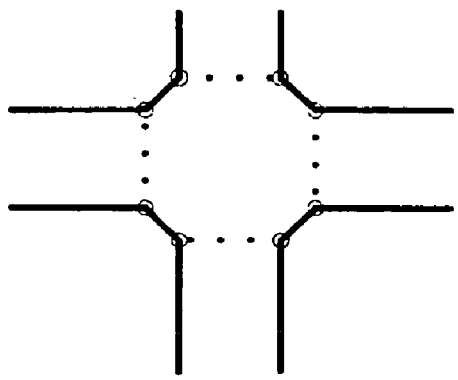
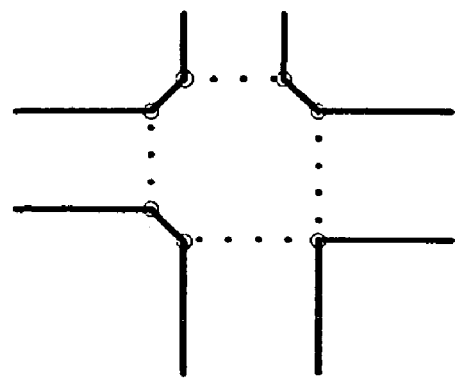
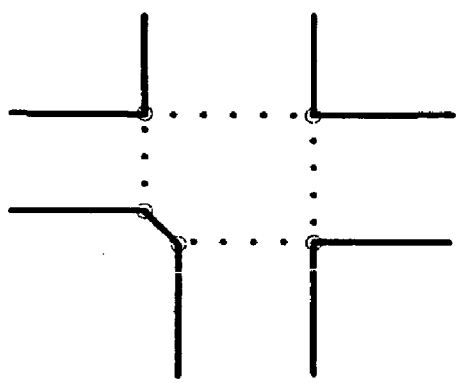
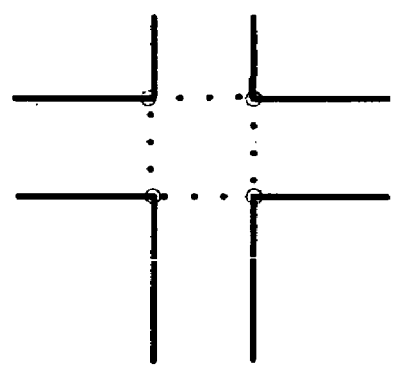
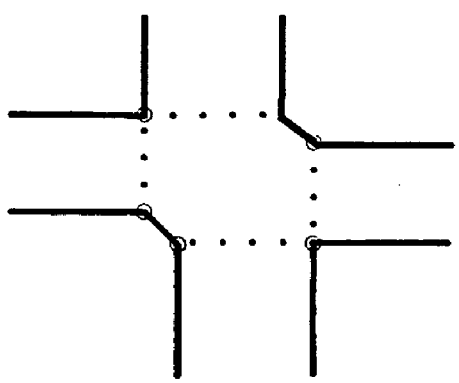
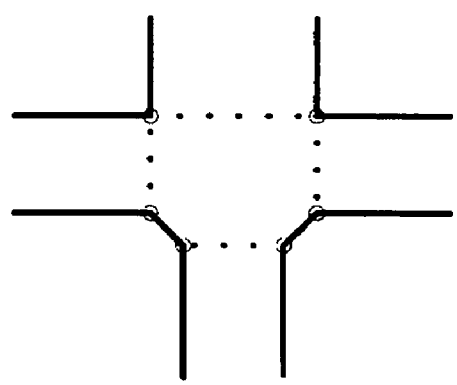

PEDESTRIAN NAVIGATION SYSTEM, INFORMATION DELIVERY SERVER, AND PROGRAM

FIELD OF THE INVENTION

The present invention relates to a communication type navigation system that includes an information delivery server that performs path seeking and path guidance, and a mobile telephone or other portable terminal. More particularly it relates to a pedestrian navigation system that performs navigation for pedestrians. A pedestrian navigation system, information delivery server, and program enable guidance in the form of spoken guidance, etc., for paths at intersections to be performed in a manner easy for the user to understand, through the selection of guidance patterns having natural associations.

RELATED ART

In recent years there has been remarkable development in mobile telephones and other portable terminals. Whereas previously mobile telephones were simply terminal devices for telephone calls, they have come to be used as general portable terminal devices that perform data communication by connecting to various servers via networks such as the Internet, and the popularity of portable terminals has become extremely high. In particular, the trend is such that in what is termed the third generation of mobile telephones, all models will carry the positioning units—such as global positioning system (GPS) receivers that determine position by receiving signals from GPS satellites—now carried by only some mobile telephones.

Technology in various fields has been proposed as application technology for such portable terminals having positioning capability. For example, a communication type navigation system for pedestrians has been proposed that is a development of a navigation system for automobiles (car navigation) and delivers map and path information from an information delivery server (path seeking server), using a mobile telephone as terminal. Moreover, settlement systems and various Internet transaction systems using mobile telephones as terminals have also been proposed. Further, mobile telephones have recently come to be used frequently for reporting events and accidents, and the need for technology to pinpoint the reporting location is constantly increasing. Attempts are also being made to pinpoint the location of elderly using the positioning system of a mobile telephone. Thus, the applications look set to continue expanding into the future.

One communication type information delivery service that has been realized is a communication type navigation system that uses a mobile telephone. For example, communication type navigation systems employing a mobile telephone and an information delivery server are disclosed in JP-2003-214860-A and JP-2001-298765-A. The navigation system disclosed in JP-2003-214860-A is composed of a portable terminal (mobile telephone) connected to a mobile communications network, and a data communication service center (information delivery computer system); the portable terminal connects with the data communication service center to receive desired data communication services. Where the portable terminal is a mobile telephone or personal handyphone system (PHS), calls can be made to desired recipients (fixed-line telephones, mobile telephones, PHS and the like) through mobile communications base stations and telephone line networks, via the mobile communications network. The data communication service center is configured to implement path navigation services in response to requests from the portable terminal in the manner below.

When a path search request containing positional information on the start point and destination is issued from the portable terminal, the data communication service center's information delivery computer system uses road data stored in a storage unit to find the optimal path from the start point to the destination, and temporarily stores data on the path found into the storage unit as guidance path data. When the portable terminal makes a display map data request specifying positional coordinates and a guidance path, the data communication service center's information delivery computer system reads out from the storage unit the map data for a vector-style map display for the area around the specified positional coordinates, and data for the specified guidance path, then converts such guidance path data into vector data for depiction as roads in particular colors and incorporates such into the map data, which are then transmitted to the portable terminal, the source of the request.

The portable terminal is equipped with a GPS receiver for fixing the present position during motion, and carries out GPS position-fixing at particular intervals. If some inadequacy indicated by the results of the GPS position-fixing arises in the display map information, the portable terminal issues a request for display map information to the data communication service center's information delivery computer system. Further, the data communication service center's information delivery computer system is provided with a storage unit, in which are stored road data (map data) and data on buildings and other landmarks, intersections and street names, etc., at various locations on the maps. Such data are updated and maintained through information delivery computer systems or similar that implement delivery of maps via an Internet network.

A path seeking method for such communication type navigation system and information delivery server is disclosed in JP-2001-165681-A. This navigation system is so configured that information on the start point and destination is sent from a portable navigation terminal to an information delivery server, and the information delivery server finds from road network and traffic network data a path that matches the seeking requirements, which is then used for guidance. Another element of the seeking conditions is the method of motion from the start point to the destination, such as walking, automobile, or walking combined with railroad, etc. This too is used as a seeking condition in path seeking.

The information delivery server has a database that takes the positions of the nodal points and bend points of the map data roads (paths) as nodes, and the paths linking the nodes as links, and contains cost information (distances and required times) on all of the links. The information delivery server references the database to search successively through the links that are present from the start point node to the destination node, tracks down the nodes and links with the lowest link cost information, and takes such as the guidance path, being able in this way to communicate the shortest path to the portable navigation terminal. Path seeking procedure of this kind that are in use include what are termed the label determination method and the Dijkstra method. A path seeking procedure using the Dijkstra method is disclosed in JP-2001-165681-A.

Also, among the aforementioned navigation systems there have been realized systems that apply spoken guidance that gives guidance for paths, for example guidance such as "Right turn at the intersection 100 meters ahead", by means of audio. A navigation system that employs spoken guidance is disclosed in JP-2003-177029-A, for example.

The in-vehicle navigation devices disclosed in JP-8-159803-A and JP-1996-20265 have long been known as technologies that carry out guidance at intersections using spoken guidance. JP-8-159803-A, for instance, has the object of providing an in-vehicle navigation device that is able to give drivers directions that accurately reflect the road situation after turning at an intersection, and to guide drivers without causing any misunderstanding even where the route is complex. A path creating section determines the route for the vehicle based on the vehicle's current position obtained via a current position locating section and the destination specified via a destination setting section, and stores in a guidance intersection memory the guidance intersections constituting the route. A route guidance section constantly monitors the vehicle's current position and emits a guidance message through a speaker when approaching a guidance intersection. The guidance messages are configured into various types that are switched among according to the distances between the successive guidance intersection points that the vehicle is to pass through.

SUMMARY OF THE INVENTION

Over recent years provision of path network data for pedestrians, which started from urban peripheries, has been advancing, and as mentioned above, pedestrian navigation systems using mobile telephones as terminals have been brought into practical use. "Path network data for pedestrians" is map data for path seeking and guidance, and is made into databases containing the end points, branch points, nodal points, and bend points of paths as nodes, along with the links joining the nodes, and the links' lengths, required times and other cost data. However, several problems specific to pedestrian navigation systems have been found. For example, FIG. 1 is a plan view of an ordinary intersection seen from directly above; observing this, one sees that it is usual for pedestrian crossings to be provided not as extensions of the walkways, but at positions a little removed from the intersection.

The pedestrian network for the intersection shown in FIG. 1 is made up of nodes A to H and links 1 to 16 joining nodes A to H. Links 4, 8, 12 and 16 are pedestrian crossing links, while links 2, 6, 10 and 14 are short links joining pairs of nodes at the corner portions of the walkways. Links 1, 3, 5, 7, etc., are long links that lie along walkways and may serve as the ingress link into the intersection or as the egress link out of the intersection, depending on the direction in which the pedestrian is walking. For example, when proceeding directly through an intersection from link 1 to link 7, link 1 will be the ingress link, node A the ingress node, link 7 the egress link, and node D the egress node.

Thus, for example, as shown in FIG. 2, the pedestrian crossing link 4 at the intersection is not an extension of walkway link 1; rather, it is constructed by first creating nodes A, B, C and D for the orthogonal walkway links 1 and 3, and links 5 and 7, then connecting together links 2 and 6, which link up those nodes. The walkway portions for turning at the intersection are composed of short links 2 and 6 that connect adjacent pedestrian crossing nodes.

For actually carrying out spoken guidance for a pedestrian at an intersection such as shown in FIGS. 1 and 2, the configuration is generally such that the direction in which to turn is given via spoken guidance at the points where the portable terminal reaches a little distance before the nodes (bend points) at which the links bend. In the case of a right turn at the intersection, the orientation changes by an angle of 45° twice as one goes from link 1 to link 2, and thence to link 3, as shown in FIG. 3A, so that the spoken guidance "Go diagonally rightward shortly" is given twice consecutively, before node A and before node B, which poses a problem of unnaturalness of the guidance.

Another problem is that in the case of passing straight across an intersection, the guidance "Go diagonally rightward shortly" before node A, "Go diagonally leftward shortly" before node B, "Go diagonally leftward shortly" before node C, and "Go diagonally rightward shortly" before node D, are implemented successively as shown in FIG. 3B. Although the pedestrian is aware that he/she is to proceed straight through, the guidance given is unnatural and causes confusion.

A further problem is that although this guidance is analogous to guidance processing for successive intersections in car navigation, applying the car navigation technology disclosed in JP-8-159803-A and JP-8-20265-A will result in the guidance "Go diagonally rightward shortly. Straight after, go diagonally rightward" in the case of a right turn at the intersection in FIG. 3A. In the case of proceeding straight though the intersection in FIG. 3B, it will be even more serious—the user will be aware that he/she is to proceed straight through, but the guidance will be "Go diagonally rightward shortly. Straight after, go diagonally leftward", which is puzzling and incoherent.

The present inventors arrived at the invention when they discovered, as a result of many and various investigations to resolve the foregoing problems, that by judging a passage path through an intersection, determining the points for spoken guidance, that is, guidance points, and selecting appropriate guidance patterns, in a pedestrian navigation system, rather than giving spoken guidance for all the nodes constituting the intersection, it will be possible to provide natural and easily understood guidance for pedestrians.

They also discovered that the aforementioned problems can be resolved in a pedestrian navigation system by preparing combinations of patterns for the pedestrian's passage through an intersection, and guidance information corresponding to each passage pattern, extracting the passage pattern for an intersection from guidance path data obtained via path seeking, then creating, and providing to the portable terminal, guidance data in which corresponding guidance patterns are set.

They further discovered that the aforementioned problems can be resolved if excess guidance is curbed by setting guidance points only for the intersection ingress node (entrance node of an intersection on the guidance path) and intersection egress node (exit node of an intersection on the guidance path) when creating the data for the guidance points for which spoken guidance along the path is to be played.

The invention is intended to resolve the aforementioned problems and has as its purpose to provide a pedestrian navigation system, information delivery server, and program, able to carry out natural guidance (spoken guidance, etc) for users of portable terminals at the bend points of intersections and the like.

According to claim 1, a pedestrian navigation system includes an information delivery server and a portable terminal connected to the information delivery server via a network. The information delivery server includes: a map database that stores nodes and links, including paths constituting intersections, and cost of each link as data; a path seeking section; an intersection path judging section that, on the basis of combinations of link lengths of passage patterns composed of multiple links having differing lengths, detects a passage path for an intersection from the guidance paths found by the path seeking section; a guidance point determining section that determines guidance points for path guidance; a guidance data creating section that determines guidance patterns for path guidance that is suited to the guidance points; and a data delivery section that delivers map data, guidance path data and guidance data to the portable terminal. The guidance point determining section selects a particular node as a guidance point from all nodes constituting an intersection, on the basis of the passage pattern detected by the intersection path judging section.

According to claim 2, in the pedestrian navigation system of claim 1, the information delivery server further includes a passage pattern database that stores: passage patterns that express paths for passage through intersections as patterns of multiple links of differing lengths constituting each of the passage paths; guidance points suited to the passage patterns; and guidance patterns for guiding along paths using the guidance points. The guidance point determining section detects the passage pattern for a path passing through an intersection and determines the guidance points by referencing the passage pattern database. The guidance data creating section creates guidance data by setting guidance patterns for the guidance points in accordance with the passage pattern.

According to claim 3, in the pedestrian navigation system of claim 1, the information delivery server includes a guidance pattern database that stores guidance patterns for guiding along paths. The guidance point determining section analyzes nodes and links constituting a path for passage through an intersection and identifies, from among pedestrian crossings constituting the intersection, a pedestrian crossing way-in node that is a way in to the intersection on the guidance path, and the egress node that is an way out from the intersection, and determines such two nodes as guidance points. The guidance data creating section creates guidance data by setting the guidance points, and guidance patterns suited to the guidance points, via referencing of the guidance pattern database.

According to claim 4, in the pedestrian navigation system of claim 1, the information delivery server includes a guidance pattern database that stores guidance patterns for guiding along paths. The guidance point determining section analyzes nodes and links constituting a path for passage through an intersection, judges the intersection's ingress node and egress node, sequentially detects the nodes and links of the passage path, starting from the ingress node, and determines particular nodes as guidance points in accordance with the detection results. The guidance data creating section creates guidance data by setting the guidance points, and guidance patterns suited to the guidance points, via referencing of the guidance pattern database.

According to claim 5, in the pedestrian navigation system of claim 1, the guidance point determining section determines the intersection's ingress node and egress node, detects the nodes from the ingress node up to the egress node, and, if the passage path's egress link is connected to a pedestrian crossing via the pedestrian crossing's way-in node, determines such ingress node as a first guidance point and, depending on relative angles of the ingoing link and outgoing link with the intersection egress node, determines the egress node as a second guidance point. The guidance data creating section creates guidance data by setting the guidance points, and guidance patterns suited to the guidance points, via referencing of the guidance pattern database.

According to claim 6, in the pedestrian navigation system of any one of claims 1 to 5, if guidance data created by the guidance data creating section does not contain a left/right turn guidance pattern as guidance for a path through an intersection, the guidance data for the intersection is deleted.

According to claim 7, an information delivery server constitutes a component of a pedestrian navigation system including an information delivery server and a portable terminal connected to the information delivery server via a network. The information delivery sever includes: a map database that stores nodes and links including paths, that constitute intersections, and cost of each link as data; a path seeking section; an intersection path judging section that, on the basis of combinations of link lengths of passage patterns composed of multiple links having different lengths, detects the passage path for an intersection from the guidance found by the path seeking section; a guidance point determining section that determines a guidance point for path guidance; a guidance data creating section that determines a guidance pattern for path guidance that is suited to the guidance points; and a data delivery section that delivers map data, guidance path data and guidance data to the portable terminal. The guidance point determining section selects a particular node as a guidance point from all nodes constituting an intersection on the basis of the passage pattern detected by the intersection path judging section.

According to claim 8, in the information delivery system of claim 7, the information delivery server further includes a passage pattern database that stores: passage patterns that express paths for passage through intersections as patterns of multiple links of differing lengths constituting each of the passage paths; guidance points suited to the passage patterns; and guidance patterns for guiding along paths using the guidance points; the guidance point determining section detects a passage pattern for a path passing through an intersection and determines the guidance points by referencing the passage pattern database. The guidance data creating section creates guidance data by setting guidance patterns for the guidance points in accordance with the passage pattern.

According to claim 9, in the information delivery system of claim 7, the information delivery server includes a guidance pattern database that stores guidance patterns for guiding along paths. The guidance point determining section analyzes node and links constituting a path for passage through an intersection and identifies, from among pedestrian crossings constituting the intersection, pedestrian crossing way-in node that is a way in to the intersection on the guidance path, and the egress node that is a way out from the intersection, and determines such two nodes as guidance points. The guidance data creating section creates guidance data by setting the guidance points, and guidance patterns suited to the guidance points, via referencing of the guidance pattern database.

According to claim 10, in the information delivery system of claim 7, the information delivery server includes a guidance pattern database that stores guidance patterns for guiding along paths. The guidance point determining section analyzes nodes and links constituting a path for passage through an intersection, judges the intersection's ingress node and egress node, sequentially detects the nodes and links of the passage path, starting from the ingress node, and determines particular nodes as guidance points in accordance with the detection results. The guidance data creating section creates guidance data by setting the guidance points, and guidance patterns suited to the guidance points, via referencing of the guidance pattern database.

According to claim 11, in the information delivery system of claim 10, the guidance point determining section determines the intersection's ingress node and egress node, detects the nodes from the ingress node up to the egress node, and, if the passage path's egress link is connected to a pedestrian crossing via the pedestrian crossing's way-in node, determines such ingress node as a first guidance point and, depending on relative angles of the ingoing link and outgoing link with the intersection egress node, determines the egress node as a second guidance point. The guidance data creating section creates guidance data by setting the guidance points, and guidance patterns suited to the guidance points, via referencing of the guidance pattern database.

According to claim 12, in the information delivery system of any one of claims 7 to 11, if guidance data created by the guidance data creating section does not contain a left/right turn guidance pattern as guidance for the path through an intersection, the guidance data for the intersection is deleted.

According to claim 13, a program enables a computer constituting an information delivery server including: a map database that stores nodes and links, including paths constituting intersections, and cost of each link as data; a path seeking section; an intersection path judging section that, on the basis of combinations of link lengths of passage patterns composed of multiple links having differing lengths, detects the passage path for an intersection from a guidance path found by the path seeking section; a guidance point determining section that determines a guidance point for path guidance; a guidance data creating section that determines a guidance pattern for path guidance that is suited to the guidance point; and a data delivery section that delivers map data, guidance path data and guidance data to a portable terminal. The information delivery server is a component of a pedestrian navigation system in which the portable terminal is connected via a network to execute processing as the guidance point determining section that selects a particular node as a guidance point from all nodes constituting an intersection on the basis of the passage pattern detected by the intersection path judging section.

According to claim 14, in the program of claim 13, the computer constitutes the information delivery server further including a passage pattern database that stores passage patterns that express paths for passage through intersections as patterns of multiple links of differing lengths constituting each of the passage paths, guidance points suited to the passage patterns, and guidance patterns for guiding along paths using the guidance points. The program enables the computer to execute: processing as the guidance point determining section that detects a passage pattern for a path passing through an intersection, and determines guidance points by referencing the passage pattern database; and processing as the guidance data creating section that creates guidance data by setting a guidance pattern for the guidance points in accordance with the passage pattern.

According to claim 15, in the program of claim 13, the computer constitutes the information delivery server further including a guidance pattern database that stores guidance patterns for guiding along paths. The program enables the computer to execute: processing as the guidance point determining section that analyzes nodes and links constituting a path for passage through an intersection and identifies, from among pedestrian crossings constituting the intersection, a pedestrian crossing way-in node that is a way in to the intersection on the guidance path, and an egress node that is a way out from the intersection, and determines such two nodes as guidance points; and processing as the guidance data creating section that creates guidance data by setting the guidance points, and guidance patterns suited to the guidance points, by referencing the guidance pattern database.

According to claim 16, in the program of claim 13, the computer constitutes the information delivery server further including a guidance pattern database that stores guidance patterns for guiding along paths. The program enables the computer to execute: processing as the guidance point determining section that analyzes nodes and links constituting a path for passage through an intersection, judges the intersection's ingress node and egress node, sequentially detects the nodes and links of the passage path, starting from the ingress node, and determines particular nodes as guidance points in accordance with the detection results; and processing as the guidance data creating section that creates guidance data by setting the guidance points, and guidance patterns suited to the guidance points, via referencing of the guidance pattern database.

According to claim 17, in the program of claim 16, the program enables the computer constituting the information delivery server to execute: processing as the guidance point determining section that determines the intersection's ingress node and egress node, detects the nodes from the ingress node up to the egress node, and, if the passage path's egress link is connected to a pedestrian crossing via the pedestrian crossing's way-in node, determines the ingress node as a first guidance point and, depending on relative angles of the ingoing link and outgoing link with the intersection egress node, determines the egress node as a second guidance point; and processing as the guidance data creating section that creates guidance data by setting the guidance points, and guidance patterns suited to the guidance points, via referencing of the guidance pattern database.

According to claim 18, in the program of any one of claims 13 to 17, the program enables the computer constituting the information delivery server to execute: deleting guidance data for an intersection if the guidance data created by the guidance data creating section does not contain a left/right turn guidance pattern as guidance for the path through the intersection.

According to claim 1, the information delivery server has: a map database that stores nodes and links, including paths that constitute intersections, and cost of each link as data; a path seeking section; an intersection path judging section that detects the passage path for an intersection from the guidance paths found by the path seeking section; a guidance point determining section that determines guidance points for path guidance; a guidance data creating section that determines guidance patterns for path guidance according to the guidance points; and a data delivery section that delivers map data, guidance path data and guidance data to the portable terminal. This information delivery server is so configured that its guidance point determining section selects a particular node as a guidance point from all nodes constituting an intersection, and guidance data suited to the guidance points are created and delivered to the portable terminal. Thus, unneeded guidance points are eliminated, guidance points that are needed for guidance are determined, and guidance that is suited to the guidance points can be carried out, so that it is possible to give natural spoken guidance that is easy for the user to understand.

According to claim 2, in the pedestrian navigation system of claim 1, the information delivery server further includes a passage pattern database that stores: passage patterns for paths through intersections; guidance points suited to the passage patterns; and guidance patterns for guiding along paths using the guidance points. The guidance point determining section detects a passage pattern for a path passing through an intersection and determines the guidance points by referencing the passage pattern database, and the guidance data creating section creates guidance data by setting guidance patterns for the guidance points in accordance with the passage pattern. Thus, unneeded guidance points are eliminated, guidance points that are needed for guidance are determined, and guidance that is suited to the guidance points can be carried out, so that it is possible to give natural spoken guidance that is easy for the user to understand. Also, the guidance points and guidance patterns can be determined in a simple manner by judging the passage pattern for an intersection.

According to claim 3, in the pedestrian navigation system of claim 1, the information delivery sever further includes a guidance pattern database that stores guidance patterns for guiding along paths. The guidance point determining section analyzes the nodes and links constituting a path for passage through an intersection and identifies, from among the pedestrian crossings constituting the intersection, the pedestrian crossing way-in node that will be the way in to the intersection on the guidance path, and the egress node that will be the way out from the intersection, and determines such two nodes as guidance points. The guidance data creating section creates guidance data by setting the guidance points, and guidance patterns suited to the guidance points, via referencing of the guidance pattern database. Thus, unneeded guidance points are eliminated, guidance points that are needed for guidance are determined, and guidance suited to the guidance points can be carried out, so that it is possible to give natural spoken guidance that is easy for the user to understand. Also, the guidance points can be determined with ease by identifying, through analysis of the nodes of the passage path through an intersection, the pedestrian crossing way-in node that will be the way in to the intersection, and the egress node that will be the way out from the intersection, thus enabling guidance patterns suited to the guidance points to be set.

According to claim 4, in the pedestrian navigation system of claim 1, the guidance point determining section analyzes the nodes and links constituting paths for passage through intersections, judges the intersection's ingress node and egress node, sequentially detects the nodes and links of the passage path, starting from the ingress node, and determines particular nodes as guidance points in accordance with such detection results. The guidance data creating section creates guidance data by setting the guidance points, and guidance patterns suited to the guidance points, via referencing of the guidance pattern database. Thus, unneeded guidance points are eliminated, the guidance points that are needed for guidance are determined, and guidance suited to the guidance points can be carried out, so that it is possible to give natural spoken guidance that is easy for the user to understand. Also, as regards guidance points, the guidance points that are needed for guidance can be selected and determined through analysis of the nodes and links of the passage path through an intersection, thus enabling guidance patterns suited to the guidance points to be set.

According to claim 5, in the pedestrian navigation system of claim 4, the guidance point determining section determines the intersection's ingress node and egress node, detects the nodes from the ingress node up to the egress node, and, if the passage path's egress link is connected to a pedestrian crossing via the pedestrian crossing's way-in node, determines such ingress node as the first guidance point and, depending on the relative angles of the ingoing link and outgoing link with the intersection egress node, determines the egress node as the second guidance point. Thus, unneeded guidance points are eliminated, the guidance points that are needed for guidance are determined, and guidance suited to the guidance points can be carried out, so that it is possible to give natural spoken guidance that is easy for the user to understand. Also, the guidance points can be determined with ease through analysis of the nodes and links of the passage path through an intersection, thus enabling the guidance patterns suited to the guidance points to be set.

According to claim 6, in the pedestrian navigation system of any one of claims 1 to 5, if a left/right turn guidance pattern as guidance for the path through an intersection is not contained, the guidance data for the intersection is deleted. Hence it is possible to ensure that no unneeded guidance is given when the pedestrian proceeds straight through an intersection.

According to claim 7, an information delivery server constituting a component of the pedestrian navigation system of claim 1 can be provided, thanks to which, unneeded guidance points can be eliminated, the guidance points that are needed for guidance can be determined, and guidance suited to the guidance points can be carried out, so that it is possible to give natural spoken guidance that is easy for the user to understand.

According to claim 8, an information delivery server constituting a component of the pedestrian navigation system of claim 2 can be provided, thanks to which, unneeded guidance points can be eliminated, the guidance points that are needed can be determined, and guidance suited to the guidance points can be carried out, so that it is possible to give natural spoken guidance that is easy for the user to understand. Also, the guidance points and guidance pattern can be determined in a simple manner by judging the passage pattern for an intersection.

According to claim 9, an information delivery server constituting a component of the pedestrian navigation system of claim 3 can be provided, thanks to which, unneeded guidance points can be eliminated, the guidance points that are needed for guidance can be determined, and guidance suited to the guidance points can be carried out, so that it is possible to give natural spoken guidance that is easy for the user to understand. Also, the guidance points can be determined with ease by identifying, through analysis of the nodes of the passage path through an intersection, the pedestrian crossing way-in node that will be the way in to an intersection, and the egress node that will be the way out from the intersection, thus enabling guidance patterns suited to the guidance points to be set.

According to claim 10, an information delivery server constituting a component of the pedestrian navigation system of claim 4 can be provided, thanks to which, unneeded guidance points can be eliminated, the guidance points that are needed for guidance can be determined, and guidance suited to the guidance points can be carried out, so that it is possible to give natural spoken guidance that is easy for the user to understand. Also, as regards guidance points, the guidance points that are needed for guidance can be selected and determined through analysis of the nodes and links of the passage path through an intersection, thus enabling guidance patterns suited to the guidance points to be set.

According to claim 11 an information delivery server constituting a component of the pedestrian navigation system of claim 5 can be provided, thanks to which, unneeded guidance points can be eliminated, the guidance points that are needed for guidance can be determined, and guidance suited to the guidance points can be carried out, so that it is possible to give natural spoken guidance that is easy for the user to understand. Also, the guidance points can be determined with ease through analysis of the nodes and links of the passage path through an intersection, thus enabling guidance patterns suited to the guidance points to be set.

According to claim 12, an information delivery server constituting a component of the pedestrian navigation system of any one of claims 1 to 5 can be provided, thanks to which, if a left/right turn guidance pattern as guidance for the path through an intersection is not contained, the guidance data for the intersection is deleted, so that it is possible to ensure that no unneeded guidance is given when the pedestrian proceeds straight through an intersection.

According to claim 13, a program can be provided for realizing the information delivery server of claim 7. According to claim 14, a program can be provided for realizing the information delivery server of claim 8. According to claim 15, a program can be provided for realizing the information delivery server of claim 9.

According to claim 16, a program can be provided for realizing the information delivery server of claim 10. According to claim 17, a program can be provided for realizing the information delivery server of claim 11. According to claim 18, a program can be provided for realizing the information delivery server of any one of claims 7 to 11.

BRIEF DESCRIPTION OF THE DRAWINGS

FIG. 6 illustrates the structure of a passage pattern database that stores passage patterns and spoken guidance patterns corresponding thereto, FIG. 6A illustrating the passage patterns and FIG. 6B illustrating the guidance patterns corresponding to the passage patterns.

FIG. 9 is a schematic view illustrating the forms of intersections.

DETAILED DESCRIPTION OF THE INVENTION

A specific instance of embodiments of the invention will now be described using an embodiment and the drawings.

First Embodiment

The pedestrian navigation system in a first embodiment of the invention will now be described. In the pedestrian navigation system of the first embodiment, spoken guidance patterns are prepared that are suited to passage patterns anticipated for when the pedestrian passes through an intersection, and guidance data is created by judging the passage pattern from the guidance path obtained as a result of path seeking.

Figure 1:
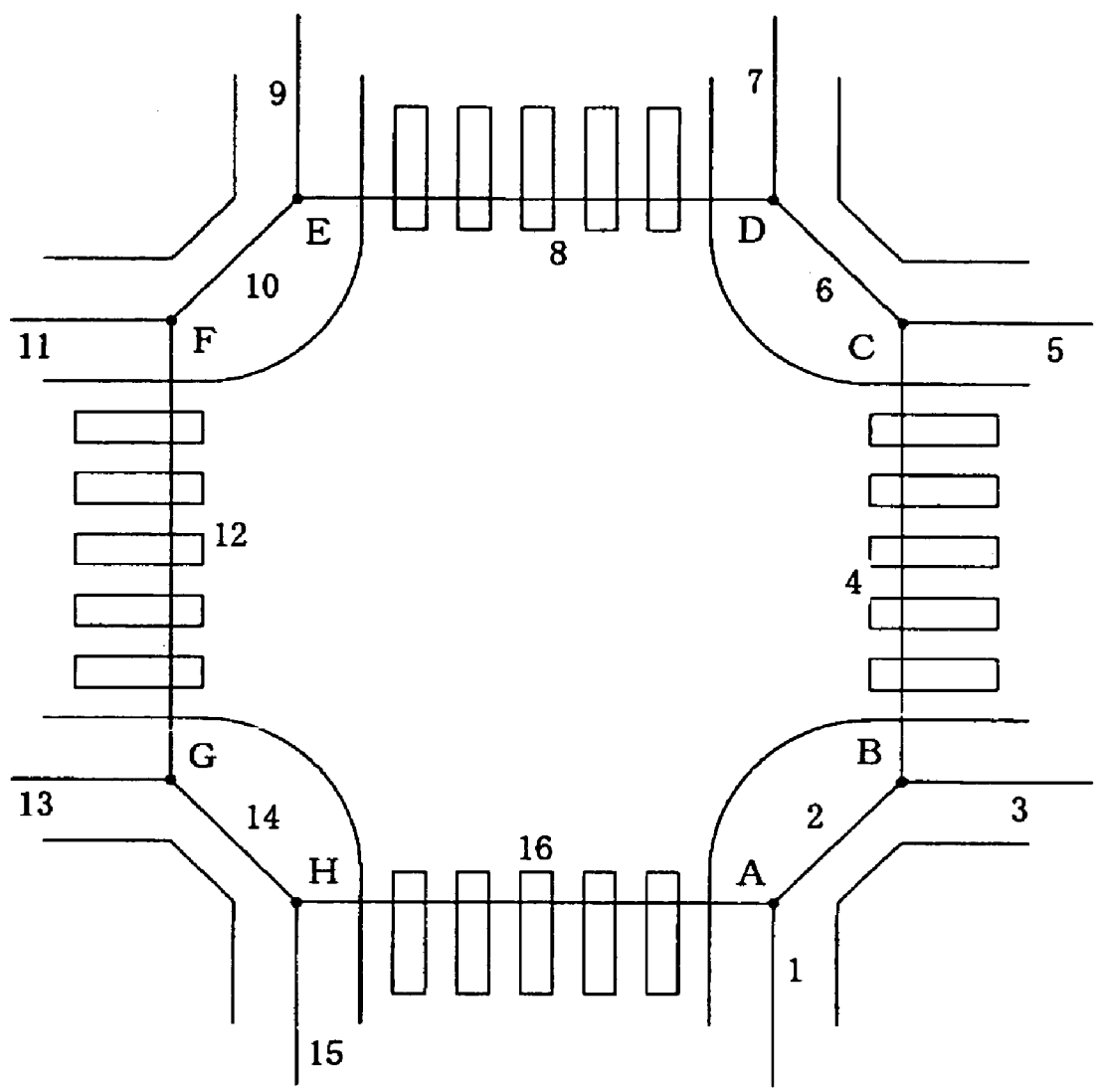
FIG. 1 is a plan view of an ordinary intersection seen from directly above.
Figure 2:
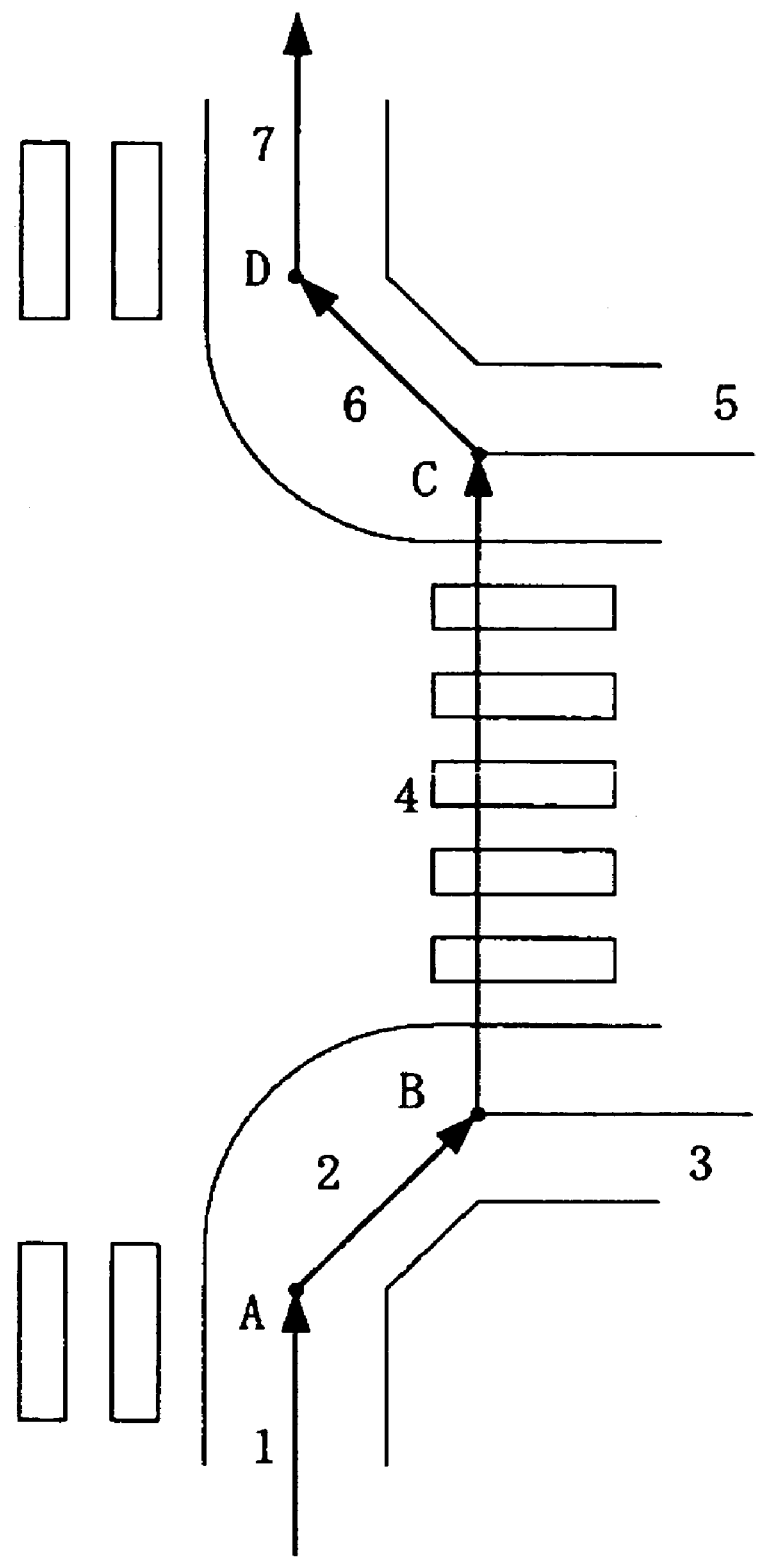
FIG. 2 is a partial plan view for explicating the configuration of the intersection links.
Figure 3A:
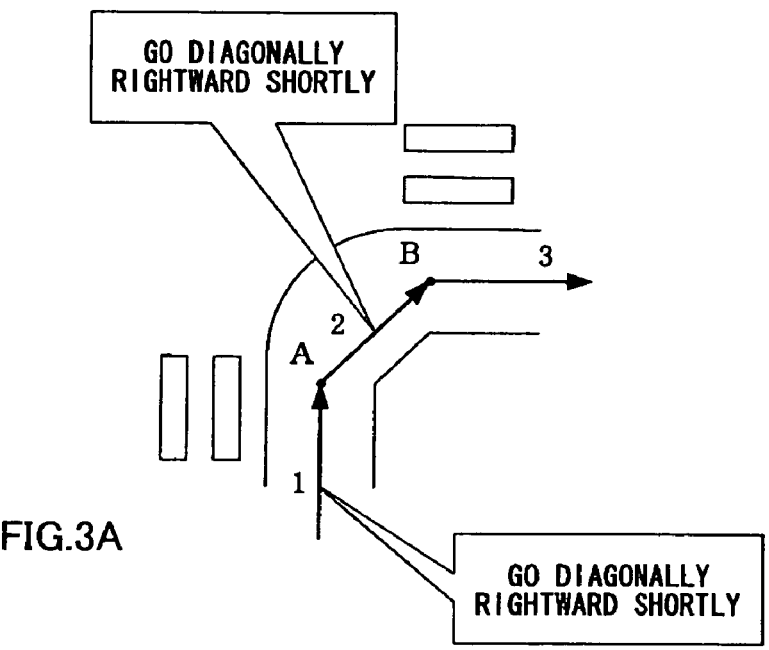
FIG. 3 shows guidance points for the spoken guidance given in a related art navigation system for passage through the intersection in FIG. 2, FIG. 3A showing the case where one turns right at the intersection, and FIG. 3B the case where one proceeds directly through it.
Figure 3B:
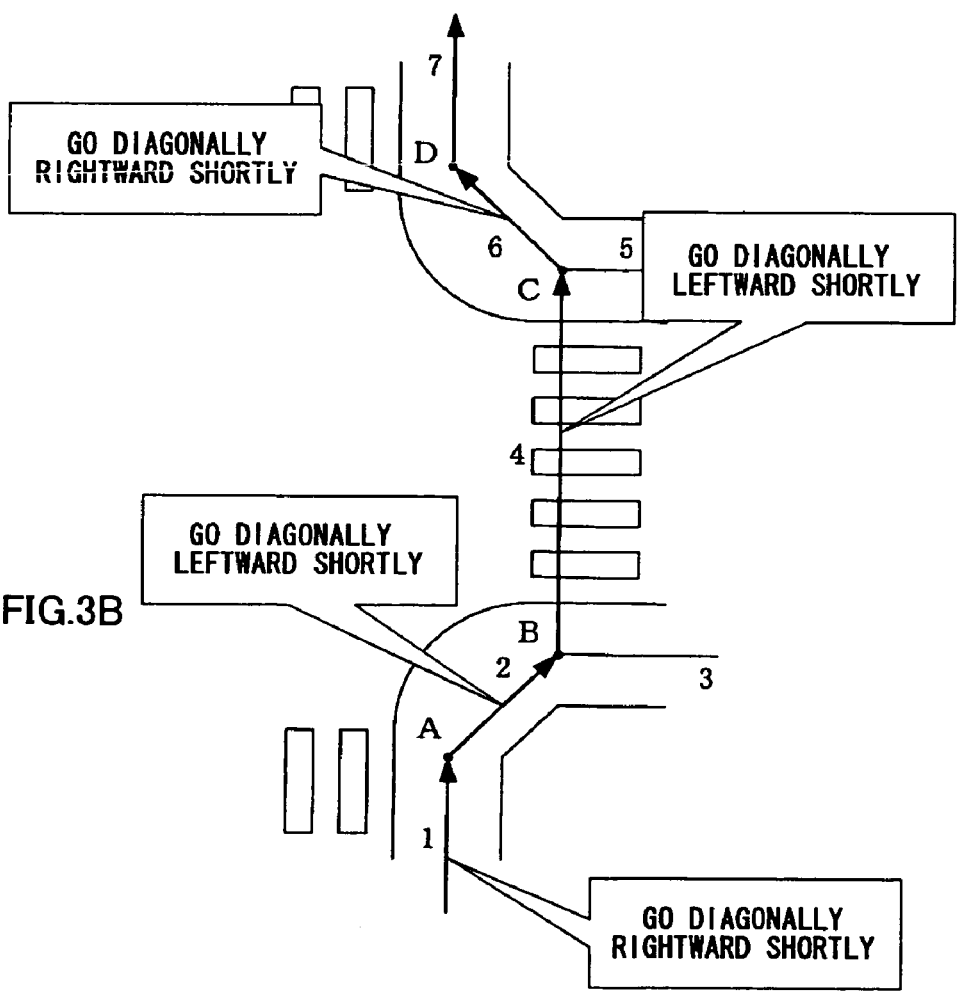
Figure 4:
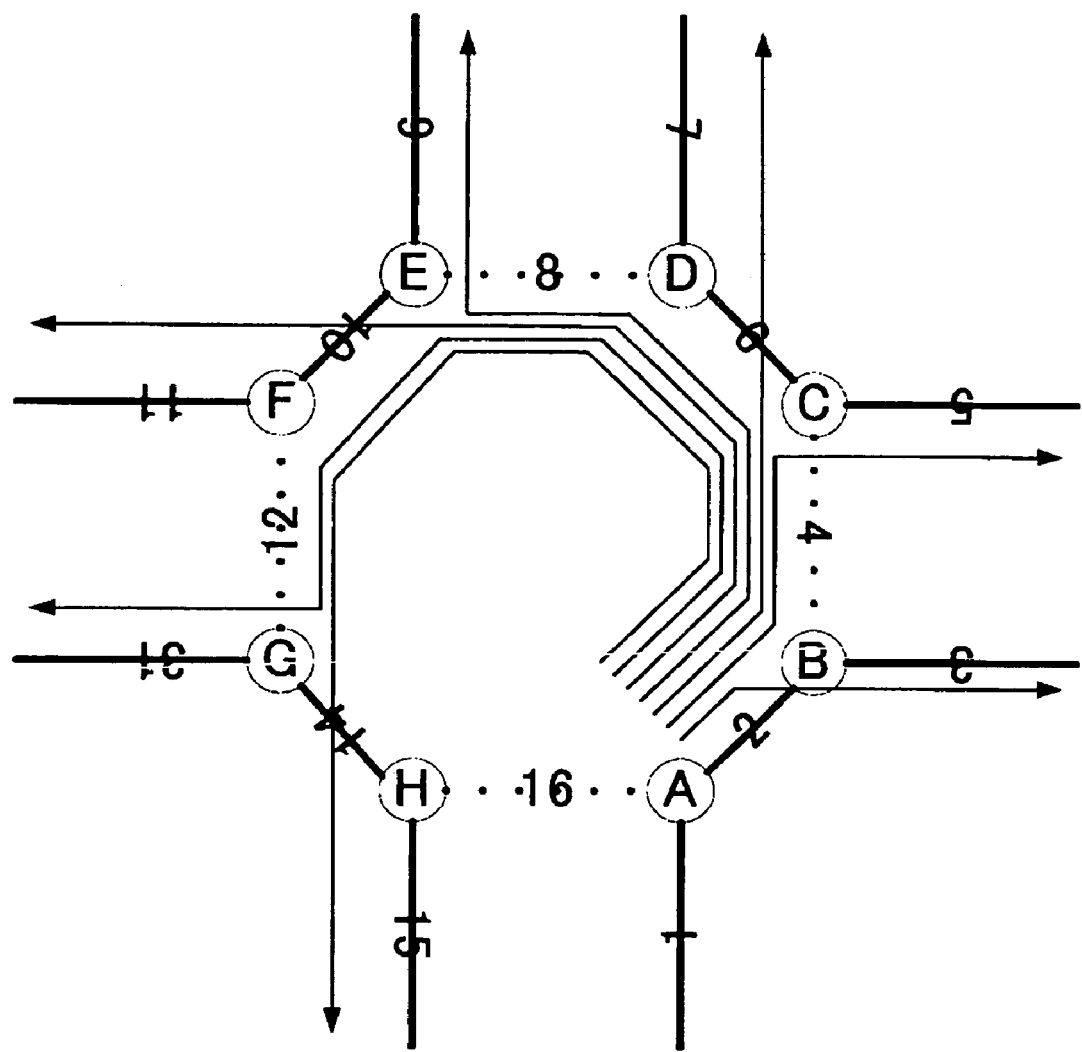
FIG. 4 is a schematic view illustrating a pattern whereby the pedestrian passes through an intersection by moving counterclockwise.
Figure 5:
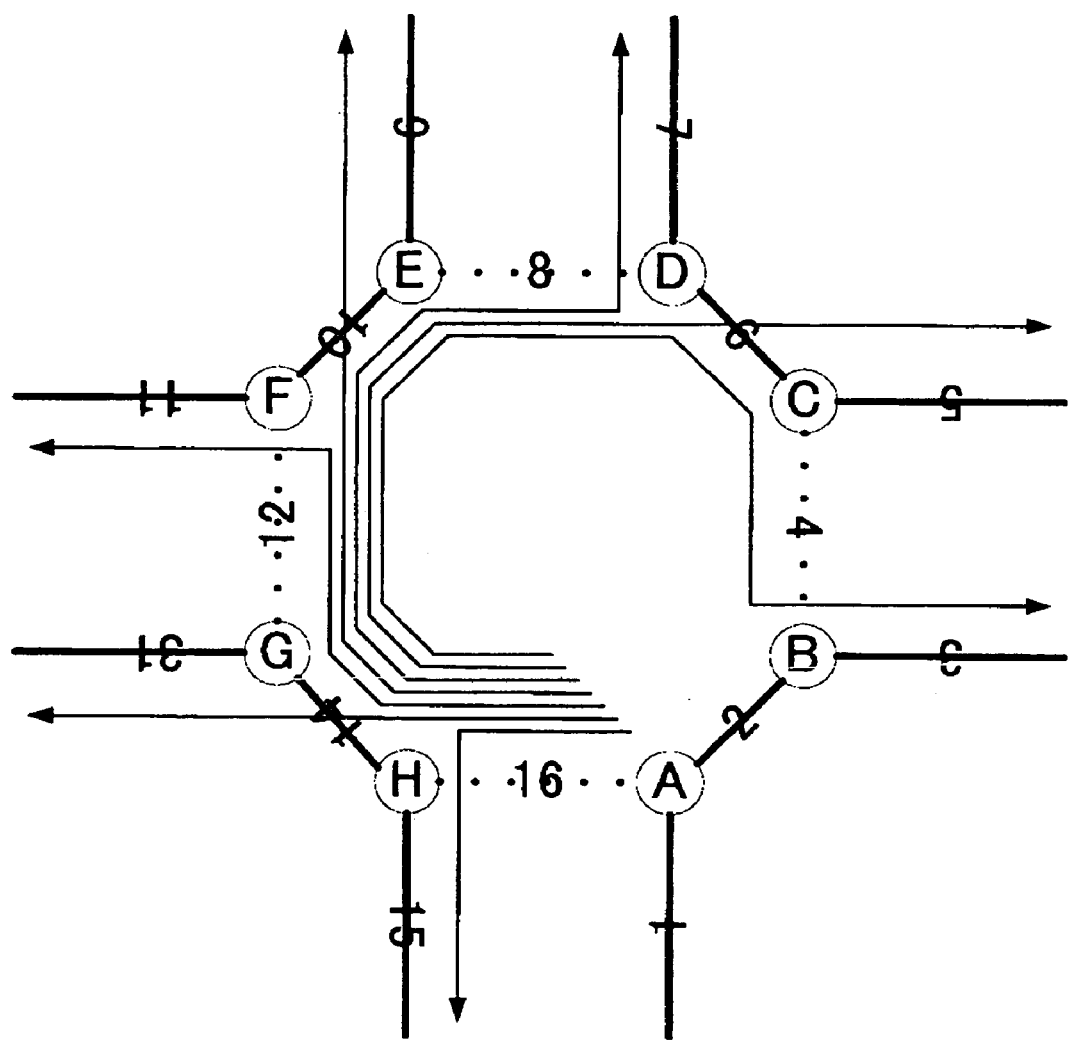
FIG. 5 is a schematic view illustrating a pattern whereby the pedestrian passes through an intersection by moving clockwise.

For example, it is found that basically there are only 14 patterns by which a pedestrian passes through an ordinary intersection. FIG. 4 is a schematic view illustrating a pattern whereby the pedestrian passes through an intersection by moving counterclockwise, and FIG. 5 is a schematic view illustrating a pattern whereby the pedestrian passes through an intersection by moving clockwise. The modes in which the pedestrian may pass through the intersection, from the time when he/she reaches node A via link 1, will now be described with reference to FIGS. 4 and 5.

Node A can be considered as a 3-way junction. Since link 1 is the ingoing link, there are two outgoing links: the short link 2 and the pedestrian crossing link 16. Firstly there are seven routes by which one can get out of the intersection by moving counterclockwise through the short link 2 (coming out into a long link), as shown in FIG. 4. Of these, the routes whereby one moves 180 degrees or more around the intersection may seem unnecessary. But there is a possibility that such a path may be sought when, for example, one needs to go toward node F, G or H at an intersection where there is no pedestrian crossing link 16. Also, in the case where a path for a wheelchair is sought and link 14 is a flight of steps or otherwise unsuitable, then a path that detours counterclockwise around the intersection may be specified for going from node A to node G. Anticipating all such cases, there are seven routes.

Likewise there are seven patterns in the case where initially one goes over the pedestrian crossing (link 16), and passes through the intersection by moving clockwise, as shown in FIG. 5. Therefore it will be understood that there are a total of 14 routes from node A onward. FIG. 6 illustrates the structure and content of a passage pattern database that stores these 14 passage patterns P1 to P14 and the spoken guidance patterns corresponding thereto. Based on this passage pattern database, the passage pattern for the guidance path obtained from the path seeking results can be judged using node A as guidance point, and the corresponding spoken guidance pattern can be set. What should be noted here is that when one proceeds through the intersection via leftward motion, there is no "leftward" guidance for the exit link at the end. The guidance will unfailingly be "Go rightward" or "Go straight ahead". Thus, in the cases other than "Go straight ahead", one can have "Go rightward" guidance for counterclockwise motion around the intersection, and "Go leftward" for clockwise motion around the intersection, so that guidance that is easy for the pedestrian to understand can be provided.

Figure 7:
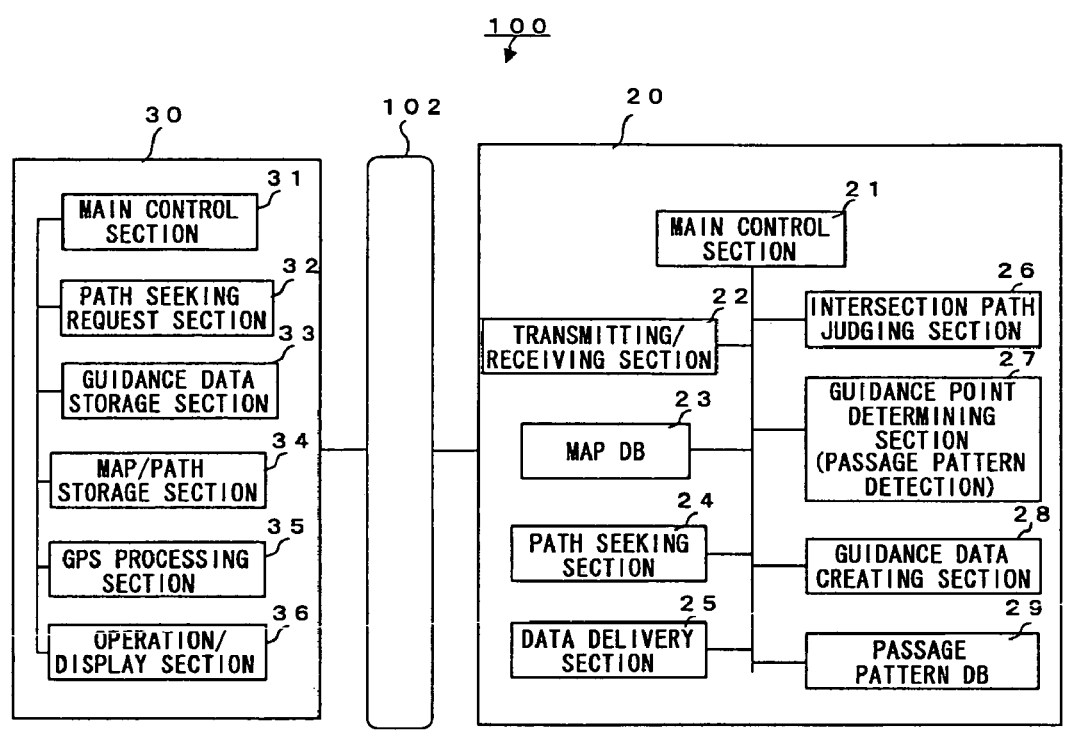
FIG. 7 is a block diagram illustrating the configuration of the pedestrian navigation system of a first embodiment of the invention.

FIG. 7 is a block diagram illustrating the configuration of the pedestrian navigation system of the first embodiment. As FIG. 7 shows, the pedestrian navigation system 100 includes an information delivery server 20 and a portable terminal 30 which are connected via a network 102. Where the portable terminal 30 is a mobile telephone, the portable terminal 30 communicates with a base station by wireless, establishes a connection relation with the information delivery server 20 via the Internet or other network 102 by means of the base station, sends service requests such as path seeking requests to the information delivery server 20, and receives map information, results of path seeking, and so on, from the information delivery server 20.

The portable terminal 30 is composed of a main control section 31, a path seeking request section 32, a guidance data storage section 33, a map/path storage section 34, a GPS processing section 35, and an operation/display section 36. At the portable terminal 30 the user carries out the desired input, manipulations and instructions via the operation/display section 36, and maps, guidance paths and the like transmitted from the information delivery server 20 are displayed on the display section. The main control section 31 is constituted principally of a microprocessor, is equipped with a storage unit such as RAM and ROM like a regular computer device, and controls the various sections through programs stored in this storage unit.

The path seeking request section 32 sends path seeking requirements such as start point, destination and motion to the information delivery server 20, and makes requests for path seeking. The start point and destination will generally be specified by means of latitude and longitude, but other methods can be used, including inputting an address or telephone number and having it converted to latitude and longitude information by the database of the information delivery server 20, or specifying a point on a map displayed on the portable terminal 30 and having it converted to latitude and longitude information. The method of motion can be walking, automobile, walking combined with transport means, etc.

In the guidance data storage section 33 there is stored path guidance that has been downloaded from the information delivery server 20 or preinstalled, for instance a "Right turn coming up" or similar display, and display and audio data corresponding to the spoken guidance pattern, for when the portable terminal 30 is approaching an intersection or branch point (guidance point). In conformance with the guidance paths, guidance points and other guidance data that the portable terminal 30 receives from the information delivery server 20, guides set in such guidance data can be displayed, or spoken guides set therein can be executed. The map/path storage section 34 is for storing the map data and guidance path data that are transmitted from the delivery server 20 to the portable terminal 30 in response to path seeking requests, and for displaying maps and guidance paths on the operation/display section 36.

The GPS processing section 35 is for receiving GPS satellite signals and processing them to fix the current position, in the same way as a regular navigation terminal (portable terminal).

The information delivery server 20 has a main control section 21, a transmitting/receiving section 22, a map database (DB) 23, a path seeking section 24, a data delivery section 25, an intersection path judging section 26, a guidance point determining section (passage pattern detection) 27, a guidance data creating section 28, and a passage pattern database (DB) 29. The main control section 21 is constituted principally of a microprocessor, is equipped with a storage unit such as RAM and ROM like a regular computer device, and controls the various sections through programs stored in this storage unit.

The transmitting/receiving section 22 is for receiving requests for data and services from the portable terminal 30 and transmitting (delivering) to the portable terminal the requested data or data needed for services. The map database (DB) 23 is a database that stores map information to be delivered to and displayed on the portable terminal 30, and map data (node, link and cost data) for path seeking. In conformance with the path seeking requirements sent from the portable terminal 30, the path seeking section 24 references the map DB 23 to find the shortest guidance path from the start point to the destination. For the seeking method, the Dijkstra method disclosed in JP-2001-165681-A can be used.

The data delivery section 25 is for delivering to the portable terminal 30 data such as data for the shortest guidance path found by the path seeking section 24, map data, and guidance data. The guidance paths are created as vector data by the path seeking section 24 and delivered to the portable terminal 30 with the map data added. The portable terminal 30 displays maps and guidance paths in its display section in conformance with the map data and guidance path data delivered. The intersection path judging section 26 detects the passage path for the intersection from among the guidance paths found by the path seeking section 24. The guidance point determining section 27 analyzes the intersection passage path found by the intersection path judging section 26 and determines whether it is any of the passage patterns P1 to P14 described in FIG. 6. The passage pattern DB 29 is a database that stores the passage patterns and the spoken guidance patterns corresponding thereto described in FIG. 6.

The guidance point determining section 27 references the passage pattern DB 29 of FIG. 6 to judge whether the passage pattern for the intersection is any of P1 to P14, following which it is determined, from the results of the intersection path judging section 26's judging, which among the intersection's nodes are to be the guidance points. The guidance data creating section 28 determines by referencing the passage pattern DB 29 the spoken guidance pattern that matches the passage pattern. These guidance point nodes and spoken guidance pattern are then prepared as guidance data. Naturally, the guidance data created by the guidance data creating section 28 contains not only guidance data for the intersection, but guidance points and spoken guidance pattern for the entire guidance path as guidance data also, the guidance data for the intersection portion being created as described earlier in such a manner that a complete range of guidance data is created.

When path seeking and guidance data creation finish in the information delivery server 20, the map data, guidance path data and guidance data are delivered to the portable terminal 30. The portable terminal 30 stores the map data and guidance path data in the map/path storage section 34, stores the guidance data in the guidance data storage section 33, and displays maps and the guidance path on the operation/display section 36. The current position of the portable terminal 30 is fixed via a particular frequency by the GPS processing unit 35. When a guidance point is reached, the spoken guidance pattern for the guidance point is read out from the guidance data storage section 33, and prepared spoken guidance is selected and played at the portable terminal 30 in conformance with the spoken guidance pattern. Audio data suited to the spoken guidance pattern can be preinstalled in the portable terminal 30 in advance. Alternatively, audio data can be downloaded from the information delivery server 20 and stored each time it is needed.

Figure 8:
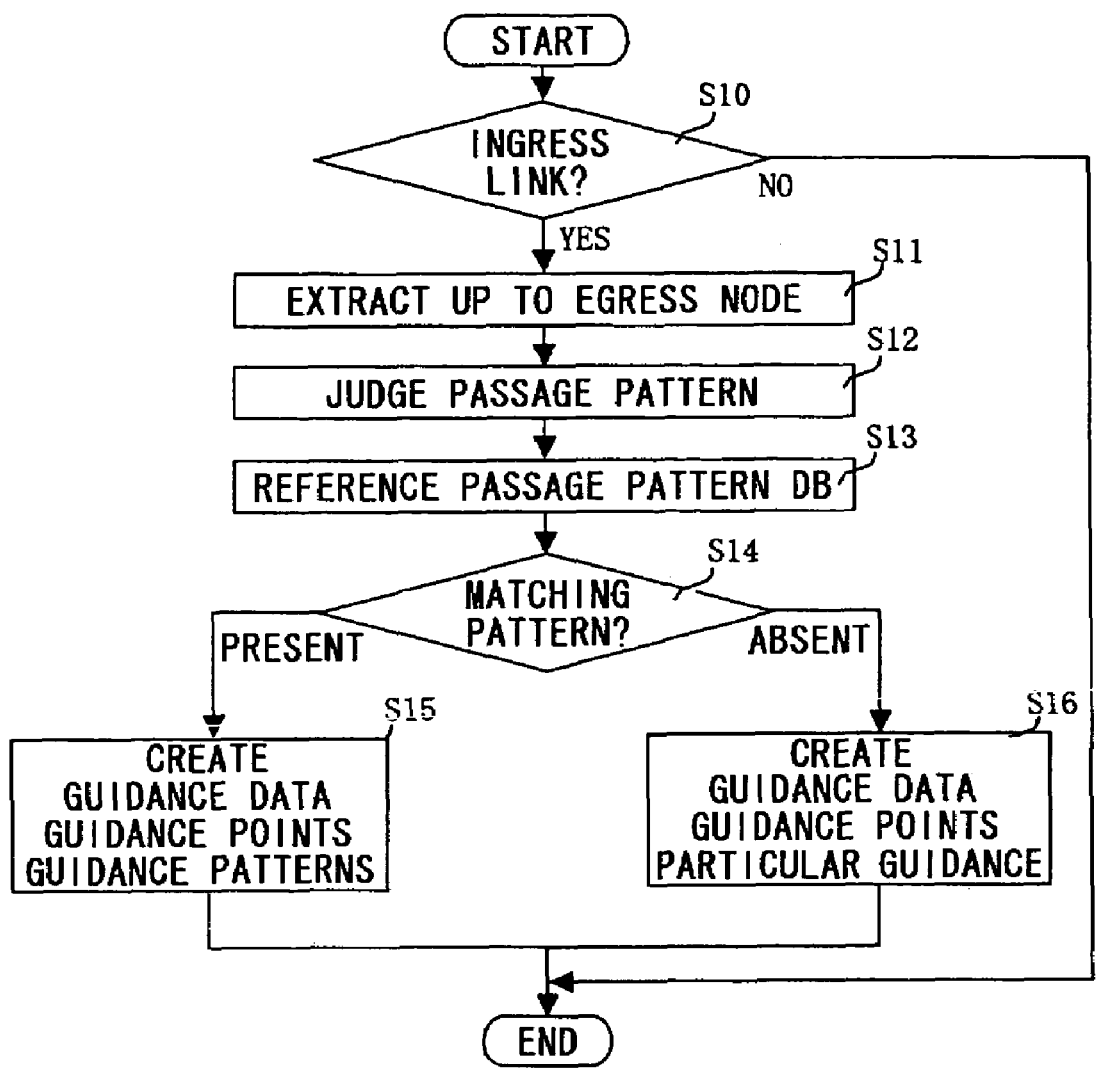
FIG. 8 is a flowchart illustrating the procedure for creating guidance data for an intersection in the pedestrian navigation system of the first embodiment.

Next, the aforementioned processing procedure for creating guidance data for an intersection in the pedestrian navigation system 100 of the first embodiment will be described with reference to the flowchart in FIG. 8. FIG. 8 is a flowchart illustrating the procedure for creating guidance data for an intersection in the pedestrian navigation system 100. This processing is a subroutine that is called up in order to find the path (passage pattern) and create the guidance data (guidance pattern) for an intersection, pursuant to the path seeking results. When this subroutine is called up (started), if it is determined in the first step S10 that the link in question is the ingress link into the intersection, then in step S11 the intersection path judging section 26 extracts the succeeding links up to the intersection egress link.

Following that, the guidance point determining unit 27 judges the passage pattern from the ingress link to the egress link. After the passage pattern has been found by the guidance point determining unit 27, it is determined, from the results of the intersection path judging section 26's judging, which among the intersection's nodes are to be the guidance points. Then in step S14 the guidance data creating section 28 determines by referencing the passage pattern DB 29 whether there is any passage pattern that matches. If there is a passage pattern that matches in step S14, then in step S15 the guidance data creating section 28 creates, as guidance data for the intersection, guidance data that takes as its guidance pattern the spoken guidance pattern corresponding to the matching passage pattern, and as its guidance point the ingress node determined by the guidance point determining unit 27.

In the passage pattern DB 29 of FIG. 6, the guidance for the pattern that proceeds as short link—pedestrian crossing—short link—long link is "Straight ahead/Go over the crossing/Go straight on", but since from the pedestrian's perspective this is a case of proceeding straight through, there is no need for such guidance. Thus, as the pedestrian does not know the structure of the links, there will be a gap between the pedestrian's perception and the structure of the links, and an advantage of the embodiment is that it closes up such a gap and permits a natural spoken guidance. If there is no passage pattern that matches in step S14, the pattern can be deemed to be an unanticipated, special path, and so in step S16 the guidance data creating section 28 will perform replacement with a particular spoken guidance pattern such as an "Intersection ahead. Consult the map carefully before proceeding" guidance pattern, and create, as guidance data for the intersection, guidance data that takes the ingress node as a guidance point.

The form of the links of this pedestrian intersection resembles a traffic circle where eight roads converge. With ordinary car navigation, the guidance can use a road name or "exit No. such-and-such" to refer to the direction of exit from the traffic circle. But no names or numbers are set for the walkways, and so this method can not be used for them. Therefore it is desirable to give considerate guidance in the manner described above.

Second Embodiment

The pedestrian navigation system of a second embodiment of the invention will now be described. The pedestrian navigation system of the second embodiment more flexibly enables natural spoken guidance for a wide variety of forms of intersection. The configurations of intersection pedestrian networks take a wide variety of forms, and in some cases intersections have a form where turnings that have short links, and turnings that do not, are mixed together as shown in FIG. 9. The pedestrian navigation system of the second embodiment is so configured that these intersections are processed in common.

In the pedestrian navigation system of the second embodiment, a passage path through an intersection is extracted from guidance path data, the way-in node for the pedestrian crossing and the egress node for the intersection are detected, and a spoken guidance pattern is determined taking these two nodes as guidance points. In this way, excess guidance is curbed, and easily understood, natural spoken guidance is provided to the user.

Figure 10:
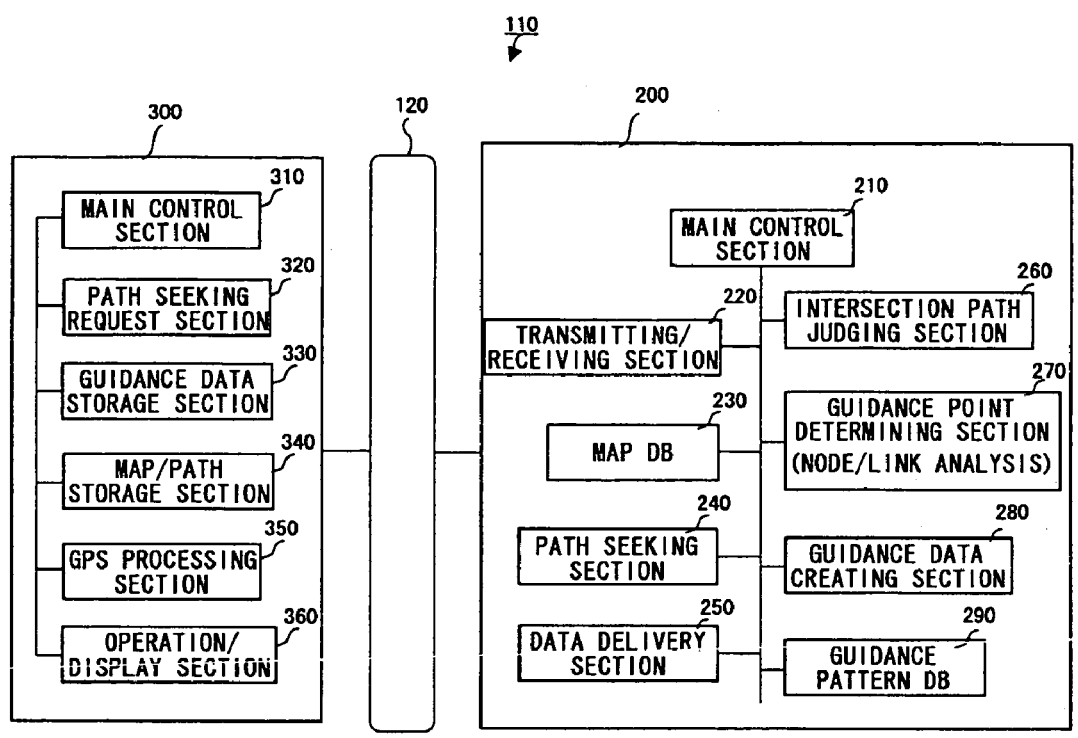
FIG. 10 is a block diagram illustrating the configuration of the pedestrian navigation system of a second embodiment of the invention.

FIG. 10 is a block diagram illustrating the configuration of the pedestrian navigation system of the second embodiment of the invention. As FIG. 10 shows, the pedestrian navigation system 110 includes an information delivery server 200 and a portable terminal 300 which are connected via a network 120. Where the portable terminal 300 is a mobile telephone, the portable terminal 300 communicates with a base station by wireless, establishes a connection relation with the information delivery server 200 via the Internet or other network 120 by means of the base station, sends service requests such as path seeking requests to the information delivery server 200, and receives map information, results of path seeking, and so on, from the information delivery server 200.

The portable terminal 300 is composed of a main control section 310, a path seeking request section 320, a guidance data storage section 330, a map/path storage section 340, a GPS processing section 350, and an operation/display section 360. At the portable terminal 300 the user carries out the desired input, manipulations and instructions via the operation/display section 360, and maps, guidance paths and the like transmitted from the information delivery server 200 are displayed on the display section. The main control section 310 is constituted principally of a microprocessor, is equipped with a storage unit such as RAM and ROM like a regular computer device, and controls the various sections through programs stored in this storage unit.

The path seeking request section 320 sends path seeking requirements such as start point, destination and motion to the information delivery server 200, and makes requests for path seeking. The start point and destination will generally be specified by means of latitude and longitude, but other methods can be used, including inputting an address or telephone number and having it converted to latitude and longitude information by the database of the information delivery server 200, or specifying a point on a map displayed on the portable terminal 300 and having it converted to latitude and longitude information. The method of motion are walking, automobile, walking combined with transport means, etc.

In the guidance data storage section 330 there is stored guidance for paths that has been downloaded from the information delivery server 200 or preinstalled, for instance a "Right turn coming up" or similar display, and display and audio data corresponding to the spoken guidance pattern, for when the portable terminal 300 is approaching an intersection or branch point (guidance point). In conformance with the guidance data such as guidance paths and guidance points that the portable terminal 300 receives from the information delivery server 200, the set guidance can be displayed, and spoken guides can be executed. The map/path storage section 340 is for storing the map data and guidance path data that are transmitted from the information delivery server 200 to the portable terminal 300 in response to path seeking requests, and for displaying maps and guidance paths on the operation/display section 360.

The GPS processing section 350 is for receiving GPS satellite signals and processing them to fix the current position, in the same way as a regular navigation terminal (portable terminal).

The information delivery server 200 has a main control section 210, a transmitting/receiving section 220, a map database (DB) 230, a path seeking section 240, a data delivery section 250, an intersection path judging section 260, a guidance point determining section (node/link analysis) 270, a guidance data creating section 280, and a guidance pattern database (DB) 290. The main control section 310 is constituted principally of a microprocessor, is equipped with storage unit such as RAM and ROM like a regular computer device, and controls the various sections through programs stored in these storage unit.

The transmitting/receiving section 220 is for receiving requests for data and services from the portable terminal 300 and transmitting (delivering) to the portable terminal the requested data or data needed for services. The map database (DB) 230 is a database that stores map information to be delivered to and displayed on the portable terminal 300, and map data (node, link and cost data) for path seeking. In conformance with the path seeking requirements sent from the portable terminal 300, the path seeking section 240 references the map DB 230 to find the shortest guidance path from the start point to the destination. For the seeking method, the Dijkstra method disclosed in JP-2001-165681-A can be used.

The data delivery section 250 is for delivering to the portable terminal 300 data such as data for the shortest guidance path found by the path seeking section 240, map data, and guidance data. The guidance paths are created as vector data by the path seeking section 240 and delivered to the portable terminal 300 with the map data added. The portable terminal 300 displays maps and guidance paths on its display section in conformance with the map data and guidance path data delivered.

The intersection path judging section 260 judges the passage path for the intersection from among the guidance paths found by the path seeking section 240, and detects the ingress node into the intersection. The guidance point determining section 270 (node/link analysis) analyzes the intersection passage path found by the intersection path judging section 260 and judges the intersection's egress node (exit node) from the ingress node (entrance node). The guidance data creating section 280 extracts from the guidance path data obtained by the path seeking section 240 via path seeking the intersection, branch point, bend point, destination and other guidance points for provision of spoken guidance, and for each such guidance point, determines from among the spoken guidance patterns prepared in advance in the guidance pattern DB (database) 290 the pattern to be used in the guidance for the guidance point—for example, a spoken guidance pattern such as "Right turn coming up"—then creates these guidance points and spoken guidance patterns into guidance data.

When path seeking and guidance data creation finish in the information delivery server 200, the map data, guidance path data and guidance data are delivered to the portable terminal 300. The portable terminal 300 stores the map data and guidance path data in the map/path storage section 340, stores the guidance data in the guidance data storage section 330, and displays maps and the guidance path on the operation/display section 360. The current position of the portable terminal 300 is fixed via a particular frequency by the GPS processing unit 350. When a guidance point is reached, the spoken guidance pattern for the guidance point is read out from the guidance data storage section 330, and prepared spoken guidance is selected and played at the portable terminal 300 in conformance with the spoken guidance pattern. Audio data suited to the spoken guidance pattern can be preinstalled in the portable terminal 300 in advance. Alternatively, audio data can be downloaded from the information delivery server 200 and stored each time it is needed.

Figure 11:
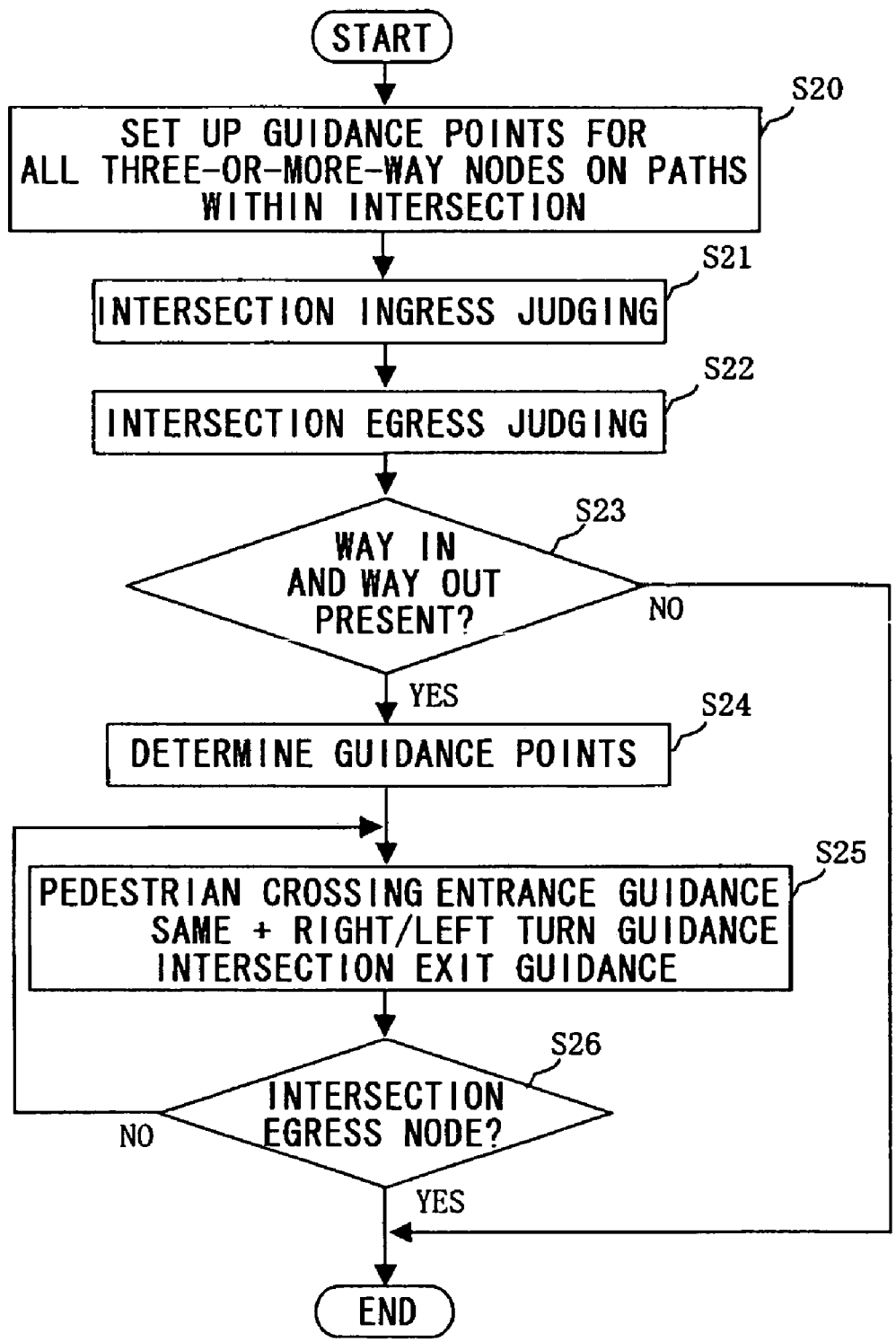
FIG. 11 is a flowchart illustrating the procedure for creating guidance data for an intersection in the pedestrian navigation system 110 of the second embodiment.

Next, the aforementioned processing procedure for creating guidance data for an intersection in the pedestrian navigation system 110 of the second embodiment will be described with reference to the flowchart in FIG. 11. FIG. 11 is a flowchart illustrating the procedure for creating guidance data for an intersection in the pedestrian navigation system 110. This processing is a subroutine that is called up in order to find the way-in node for the pedestrian crossing and the egress node for the intersection, pursuant to the path seeking results, and to create guidance data using such two points as guidance points.

Figure 12:
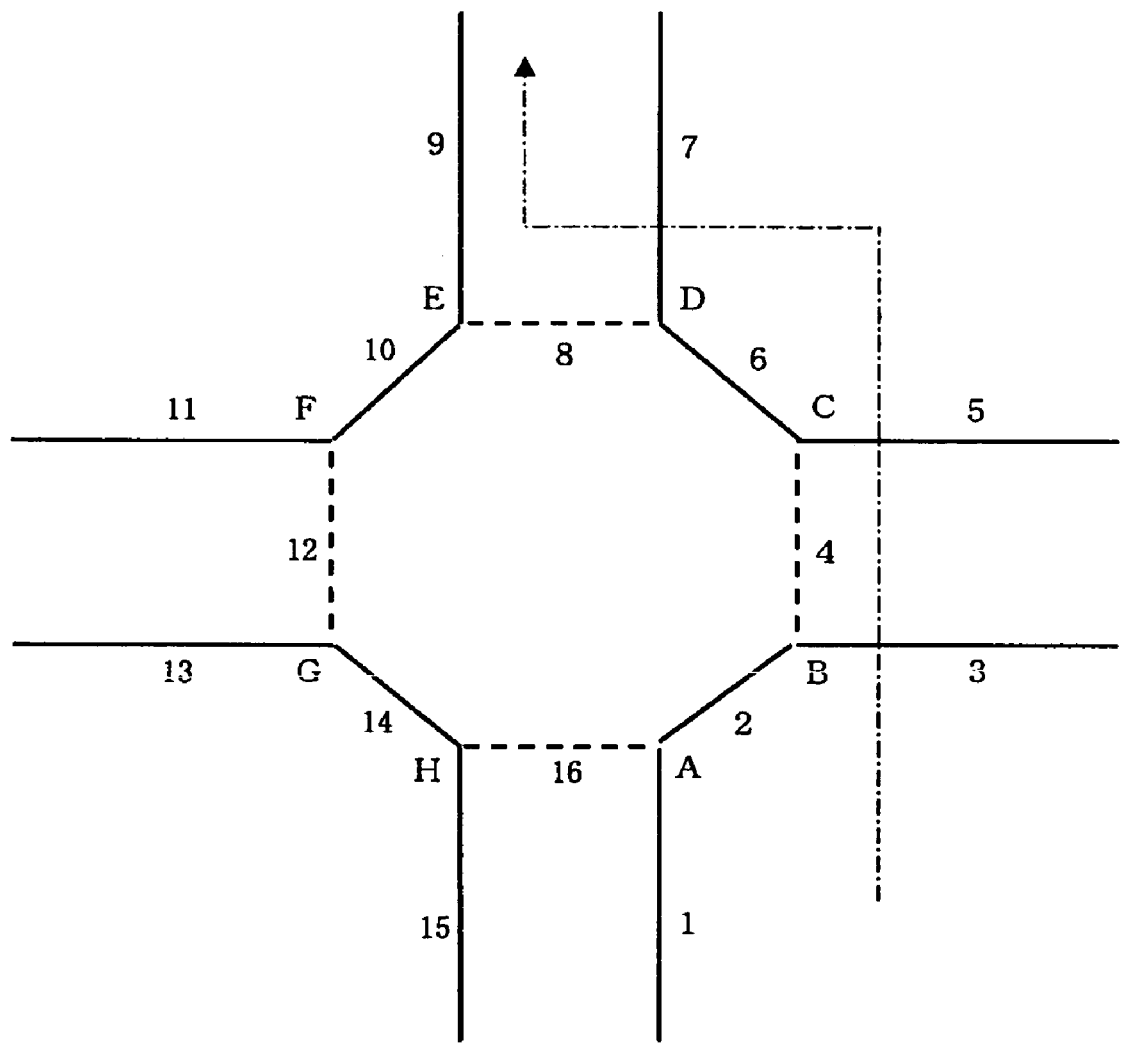
FIG. 12 is a plan view illustrating the configuration of the path network of an intersection.
Figure 13A:
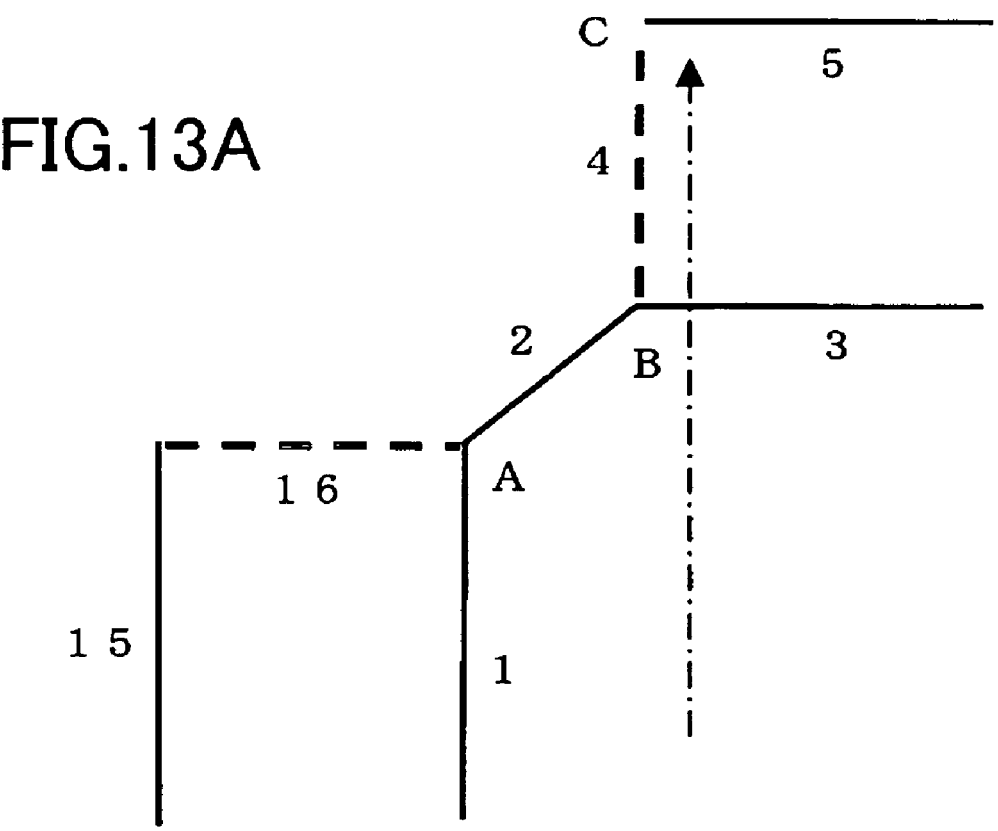
FIG. 13 gives views illustrating parts of the path network of an intersection in order to explicate the guidance points and the guidance patterns therefore, FIG. 13A illustrating one intersection form and FIG. 13B illustrating another intersection form.
Figure 13B:
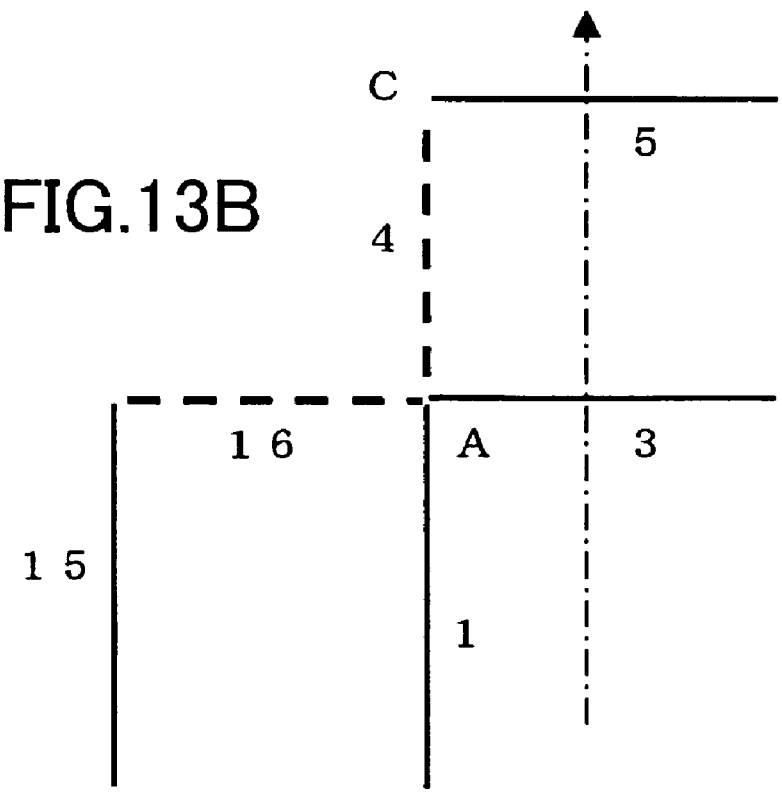
Figure 14A:
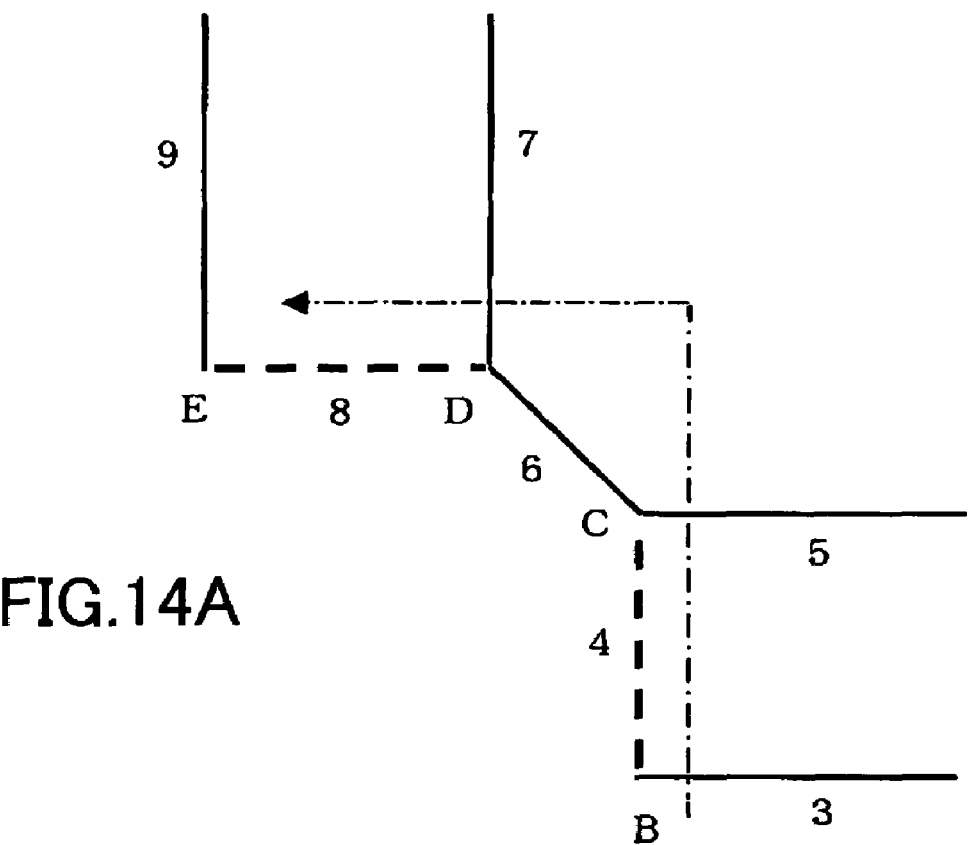
FIG. 14 gives views illustrating parts of the path network of an intersection in order to explicate the guidance points and the guidance patterns therefore, FIG. 14A illustrating one intersection form and FIG. 14B illustrating another intersection form.
Figure 14B:
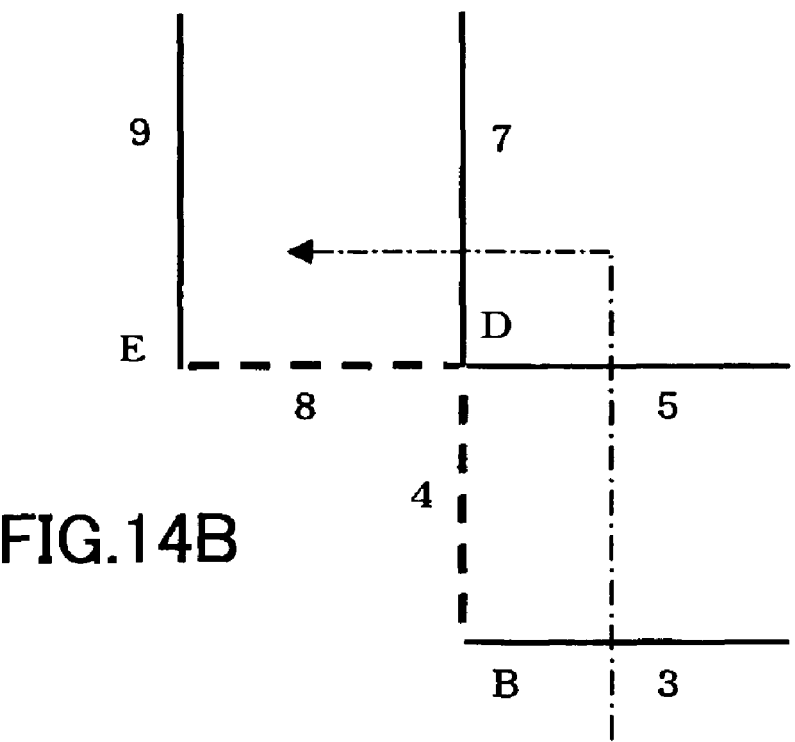
Figure 15A:
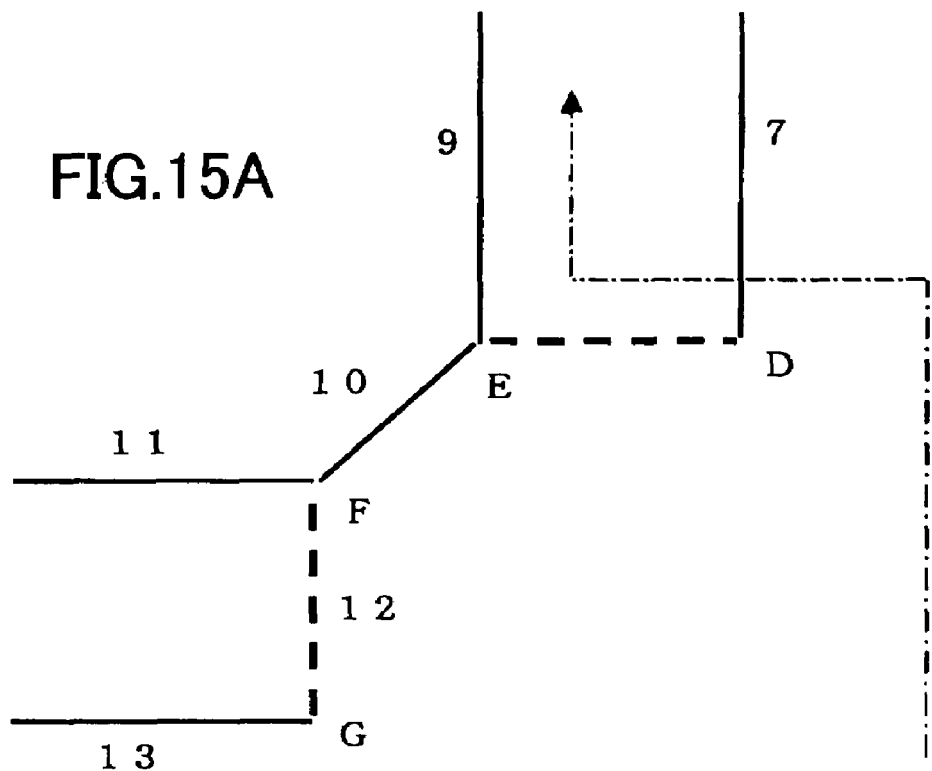
FIG. 15 gives views illustrating parts of the path network of an intersection in order to explicate the guidance points and the guidance patterns therefore, FIG. 15A illustrating one intersection form and FIG. 15B illustrating another intersection form.
Figure 15B:
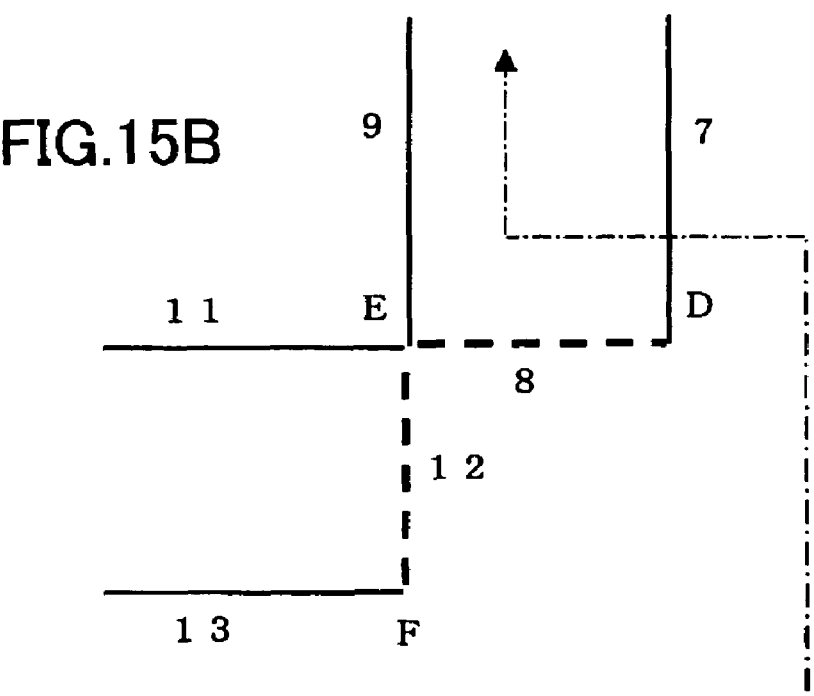

When this subroutine is called up (started), firstly in step S20 the intersection path judging section 260 extracts one of the intersections through which the guidance path passes, and the guidance point determining section (node/link analysis) 270 finds the three-or-more-way nodes of such intersection and nominates these nodes as candidates for guidance points (this is termed "setting up guidance points"). At this juncture, no specific guidance data has even been created. FIG. 12 is a diagram illustrating an intersection network for the purpose of explicating this state. In FIG. 12, nodes B, D and E are three-or-more-way nodes and are set up as guidance points. FIGS. 13 to 15 are diagrams illustrating an intersection network for the purpose of explicating examples of guidance patterns for the guidance points.

In the succeeding step S21, the intersection path judging section 260 carries out intersection ingress judging. In intersection ingress judging, if a node meets either of the conditions below it is judged to be the ingress node (entrance node) for the intersection.

(1) Three-way node whose ingress link (ingoing link) is a long walkway (long link), and which has one pedestrian crossing and one short link walkway (short link) for its outgoing links. An example of a node that meets this condition is node A in the intersection network of FIG. 12.

(2) Four-way node whose ingress link is a long walkway, whose egress link is a pedestrian crossing, and which has two pedestrian crossings for its outgoing links.

Next, in step S22, the intersection path judging section 260 carries out intersection egress judging. In intersection egress judging, if a node meets either of the conditions below it is judged to be the egress node (exit node) for the intersection.

(1) Three-way node whose egress link is a long walkway (long link), and which has a short walkway (short link) and a pedestrian crossing for its outgoing links. An example of a node that meets this condition is node E in the intersection network of FIG. 12.

(2) Four-way node whose egress link is a long walkway, and which has two pedestrian crossings among its outgoing links.

When the intersection ingress judging and intersection egress judging of steps S21 and S22 have finished, in step S23 the intersection path judging section 260 judges whether a way in and a way out for the intersection are present. If either the way in or the way out is not present, processing is ended without any specific processing for an intersection being performed. If both are present, then in step S24 the guidance point determining section 270 performs sequential checking from the intersection's ingress node through to the egress node, determining the guidance points in the following manner while it does so.

(1) Pedestrian crossing entrance: guidance point 1, which is the first pedestrian crossing entrance that is found when the nodes are searched from the intersection entrance toward the exit.
(2) Guidance point that is a pedestrian crossing entrance and also requires left/right turn guidance: guidance point 2, which is the second pedestrian crossing entrance that is found when the nodes are searched from the intersection entrance toward the exit, and is the guidance point the egress link from which is a pedestrian crossing.
(3) Guidance point that is an intersection exit and also requires left/right turn guidance: whether or not this guidance point 3 is needed for the intersection exit is decided depending on the relative angle between guidance point 2's egress link and the intersection exit's egress link.

In the next step S25 the guidance data creating section 280 performs sequential checking from the intersection's ingress node through to the egress node, and while it does so sets spoken guidance patterns for the guidance points determined by the guidance point determining section 270 in step S24, so as to create guidance data.

The spoken guidance patterns are determined by meeting the conditions below.

(Pedestrian Crossing Entrance: Guidance Point 1)
(1) In creating the guidance data, the guidance pattern "Pedestrian crossing" is selected for the guidance point which is set up at the first pedestrian crossing entrance that is found when tracing along the guidance path from the intersection's way in toward its way out, and the egress link from which is a pedestrian crossing. Further, depending on the relative angle between the guidance point's ingress link and egress link, a guidance pattern for a left/right turn or for proceeding straight through is added. For example, it will be "Pedestrian crossing" plus "Go straight through" or the like. This is the case where at node A in FIG. 13A the path corresponds to the pedestrian crossing link 4, and node A will be guidance point 1.
(2) If the egress link from a guidance point is a long walkway (long link), the guidance will be right turn or left turn. Since in this case the guidance point will be the egress node of the intersection, it will be a condition for ending of the guidance for the intersection. This is the case where at node A in FIG. 13B the path corresponds to the long link 3, and node A will be guidance point 1. The guidance here will be right turn guidance.

(Pedestrian Crossing Entrance, also Requiring Left/Right Turn Guidance: Guidance Point 2)

Concerning the guidance point which is the second pedestrian crossing that is found when proceeding from the intersection ingress node (link) toward the egress node (link), and the egress link from which is a pedestrian crossing:
(1) The guidance at guidance point 2 is created depending on the relative angle between guidance point 1's egress link derived earlier and guidance point 2 derived via the foregoing method. For example, at guidance point 1, "Pedestrian crossing" plus "Go straight through" will be selected, and at guidance point 2, "Pedestrian crossing" plus "Go leftward" will be selected. Node B in FIG. 14A qualifies as guidance point 1, and node D as guidance point 2.
(2) If the egress link from guidance point 2 is a long walkway (long link), the guidance will be to proceed straight through, and so guidance point 2 will not be set up. In this case, guidance point 2 will be the intersection's egress node and hence will be a condition for ending of the guidance for the intersection.

(Intersection Exit, also Requiring Left/Right Turn Guidance: Guidance Point 3)

A spoken guidance pattern will be selected, and guidance data created, for a guidance point 3 that is an intersection exit and moreover requires left/right turn guidance.

Whether or not a guidance point is needed for the intersection exit is decided depending on the relative angle difference between guidance point 2's egress link and the intersection exit's egress link. The guidance at the intersection exit is created according to the relative angle between guidance point 2's egress link and the intersection exit's egress link. Node B in FIG. 13A will be guidance point 1, node D in FIG. 14A will be guidance point 2, and node E in FIG. 15A will be guidance point 3. If there will be left/right turn guidance, a guidance point will be set up for the intersection exit. The guidance for the various guidance points will be, for example:

Guidance point 1 "Pedestrian crossing" plus "Go straight through"

Guidance point 2 "Pedestrian crossing" plus "Go leftward"

Guidance point 3 "Go leftward"

whereupon the guidance will end.

Where the guidance at the intersection exit is to proceed straight through, no guidance point is set up for the intersection exit. Further, if there is ultimately not even one left/right turn guidance for the intersection, then it will be permissible to erase all of the guidance points and not implement any guidance. This is because in such a case the pedestrian will simply be normally proceeding ahead, so that guidance will be unnecessary.

INDUSTRIAL APPLICABILITY

Thus as described above, according to the pedestrian navigation system of the invention it is possible to limit the guidance points at intersections to the nodes that require spoken or other guidance, so that easily understood and natural spoken guidance can be provided to the user.

The invention claimed is:
1. A pedestrian navigation system comprising:
an information delivery server; and
a portable terminal connected to said information delivery server via a network;
said information delivery server comprising:
    a map database that stores nodes and links, including paths constituting intersections, and cost of each link as data;
    a path seeking section;
    an intersection path judging section that, on the basis of combinations of link lengths of passage patterns composed of multiple links having differing lengths, detects a passage path for an intersection from the guidance paths found by said path seeking section;
    a guidance point determining section that determines a guidance point for path guidance;
    a guidance data creating section that determines a guidance pattern for path guidance that is suited to the guidance point; and
    a data delivery section that delivers map data, guidance path data and guidance data to said portable terminal; and
said guidance point determining section selecting a particular node as a guidance point from all nodes constituting an intersection, on the basis of the passage pattern detected by said intersection path judging section.
2. The pedestrian navigation system according to claim 1, wherein:
said information delivery server further comprises a passage pattern database that stores: passage patterns that express paths for passage through intersections as patterns of multiple links of differing lengths constituting each of said passage paths; guidance points suited to said passage patterns; and guidance patterns for guiding along paths using said guidance points;

said guidance point determining section detects the passage pattern for a path passing through an intersection and determines the guidance points by referencing said passage pattern database; and said guidance data creating section creates guidance data by setting guidance patterns for the guidance points in accordance with said passage pattern.

3. The pedestrian navigation system according to claim 1, wherein:

said information delivery server comprises a guidance pattern database that stores guidance patterns for guiding along paths;

said guidance point determining section analyzes nodes and links constituting a path for passage through an intersection and identifies, from among pedestrian crossings constituting the intersection, a pedestrian crossing ingress node that is a way in to the intersection on the guidance path, and an egress node that is an way out from the intersection, and determines said two nodes as guidance points; and said guidance data creating section creates guidance data by setting said guidance points, and guidance patterns suited to said guidance points, via referencing of said guidance pattern database.

4. The pedestrian navigation system according to claim 1, wherein:

said information delivery server comprises a guidance pattern database that stores guidance patterns for guiding along paths;

said guidance point determining section analyzes nodes and links constituting a path for passage through an intersection, judges the intersection's ingress node and egress node, sequentially detects the nodes and links of the passage path, starting from said ingress node, and determines particular nodes as guidance points in accordance with said detection results; and said guidance data creating section creates guidance data by setting said guidance points, and guidance patterns suited to said guidance points, via referencing of said guidance pattern database.

5. The pedestrian navigation system according to claim 4, wherein:

said guidance point determining section determines the intersection's ingress node and egress node, detects the nodes from said ingress node up to the egress node, and, if the passage path's egress link is connected to a pedestrian crossing via the pedestrian crossing's way-in node, determines said ingress node as a first guidance point and, depending on relative angles of the ingoing link and outgoing link with the intersection egress node, determines said egress node as a second guidance point; and said guidance data creating section creates guidance data by setting said guidance points, and guidance patterns suited to said guidance points, via referencing of said guidance pattern database.

6. The pedestrian navigation system according to any one of claims 1 to 5, wherein:

if guidance data created by said guidance data creating section does not contain a left/right turn guidance pattern as guidance for a path through an intersection, the guidance data for said intersection is deleted.

7. An information delivery server constituting a component of a pedestrian navigation system including an information delivery server and a portable terminal connected to said information delivery server via a network, said information delivery server comprising:

a map database that stores nodes and links, including paths that constitute intersections, and cost of each link as data;

a path seeking section;

an intersection path judging section that, on the basis of combinations of link lengths of passage patterns composed of multiple links having differing lengths, detects a passage path for an intersection from the guidance paths found by said path seeking section;

a guidance point determining section that determines a guidance point for path guidance;

a guidance data creating section that determines a guidance pattern for path guidance that is suited the guidance point; and a data delivery section that delivers map data, guidance path data and guidance data to said portable terminal; and said guidance point determining section selecting a particular node as a guidance point from all nodes constituting an intersection, on the basis of the passage pattern detected by said intersection path judging section.

8. The information delivery server according to claim 7, wherein:

said information delivery server further comprises a passage pattern database that stores: passage patterns that express paths for passage through intersections as patterns of multiple links of differing lengths constituting each of said passage paths; guidance points suited to said passage patterns; and guidance patterns for guiding along paths using said guidance points;

said guidance point determining section detects a passage pattern for a path passing through an intersection and determines the guidance points by referencing said passage pattern database; and said guidance data creating section creates guidance data by setting guidance patterns for the guidance points in accordance with said passage pattern.

9. The information delivery server according to claim 7, wherein:

said information delivery server comprises a guidance pattern database that stores guidance patterns for guiding along paths;

said guidance point determining section analyzes nodes and links constituting a path for passage through an intersection and identifies, from among pedestrian crossings constituting the intersection, a pedestrian crossing ingress node that is a way in to the intersection on the guidance path, and the egress node that will is a way out from the intersection, and determines said two nodes as guidance points; and said guidance data creating section creates guidance data by setting said guidance points, and guidance patterns suited to said guidance points, via referencing of said guidance pattern database.

10. The information delivery server according to claim 7, wherein:

said information delivery server comprises a guidance pattern database that stores guidance patterns for guiding along paths;

said guidance point determining section analyzes nodes and links constituting a path for passage through an intersection, judges the intersection's ingress node and egress node, sequentially detects the nodes and links of the passage path, starting from said ingress node, and determines particular nodes as guidance points in accordance with said detection results; and said guidance data creating section creates guidance data by setting said guidance points, and guidance patterns suited to said guidance points, via referencing of said guidance pattern database.

11. The information delivery server according to claim 10, wherein:

said guidance point determining section determines the intersection's ingress node and egress node, detects the nodes from said ingress node up to the egress node, and, if the passage path's egress link is connected to a pedestrian crossing via the pedestrian crossing's way-in node, determines said ingress node as a first guidance point and, depending on relative angles of the ingoing link and outgoing link with the intersection egress node, determines said egress node as a second guidance point; and said guidance data creating section creates guidance data by setting said guidance points, and guidance patterns suited to said guidance points, via referencing of said guidance pattern database.

12. The information delivery server according to any one of claims 7 to 11, wherein:

if guidance data created by said guidance data creating section does not contain a left/right turn guidance pattern as guidance for the path through an intersection, the guidance data for said intersection is deleted.

13. A program that enables a computer constituting an information delivery server, said information delivery server comprising: a map database that stores nodes and links, including paths constituting intersections, and cost of each link as data; a path seeking section; intersection path judging section that, on the basis of combinations of link lengths of passage patterns composed of multiple links having differing lengths, detects a passage path for an intersection from the guidance paths found by said path seeking section; a guidance point determining section that determines a guidance point for path guidance; a guidance data creating section that determines a guidance pattern for path guidance that is suited to the guidance point; and a data delivery section that delivers map data, guidance path data and guidance data to said portable terminal; said information delivery server being a component of a pedestrian navigation system in which a portable terminal is connected via a network, to execute processing as a guidance point determining section that selects a particular node as a guidance point from all nodes constituting an intersection, on the basis of the passage pattern detected by said intersection path judging section.

14. The program according to claim 13, wherein:

said computer constitutes said information delivery server further comprising a passage pattern database that stores passage patterns that express paths for passing through intersections using patterns of multiple links of differing lengths constituting each of said passage paths, guidance points suited to the passage patterns, and guidance patterns for guiding along paths using said guidance points, and said program enables said computer to execute:

processing as said guidance point determining section that detects a passage pattern for a path passing through an intersection, and determines guidance points by referencing said passage pattern database; and processing as said guidance data creating section that creates guidance data by setting a guidance pattern for the guidance points in accordance with said passage pattern.

15. The program according to claim 13, wherein:

said computer constitutes said information delivery server further comprising a guidance pattern database that stores guidance patterns for guiding along paths, and said program enables said computer to execute:

processing as said guidance point determining section that analyzes nodes and links constituting a path for passage through an intersection and identifies, from among pedestrian crossings constituting the intersection, a pedestrian crossing way-in node that is a way in to the intersection on the guidance path, and an egress node that is a way out from the intersection, and determines such two nodes as guidance points; and processing as said guidance data creating section that creates guidance data by setting said guidance points, and guidance patterns suited to said guidance points, by referencing said guidance pattern database.

16. The program according to claim 13, wherein:

said computer constitutes said information delivery server further comprising a guidance pattern database that stores guidance patterns for guiding along paths, said program enables said computer to execute:

processing as said guidance point determining section that analyzes nodes and links constituting a path for passage through an intersection, judges the intersection's ingress node and egress node, sequentially detects the nodes and links of the passage path, starting from said ingress node, and determines particular nodes as guidance points in accordance with said detection results; and processing as said guidance data creating section that creates guidance data by setting said guidance points, and guidance patterns suited to said guidance points, via referencing of said guidance pattern database.

17. The program according to claim 16, wherein:

said program enables said computer constituting said information delivery server to execute:

processing as said guidance point determining section that determines the intersection's ingress node and egress node, detects the nodes from said ingress node up to the egress node, and, if the passage path's egress link is connected to a pedestrian crossing via the pedestrian crossing's way-in node, determines said ingress node as a first guidance point and, depending on relative angles of the ingoing link and outgoing link with the intersection egress node, determines said egress node as a second guidance point; and processing as said guidance data creating section that creates guidance data by setting said guidance points, and guidance patterns suited to said guidance points, via referencing of said guidance pattern database.

18. The program according to any one of claims 13 to 17, wherein:

said program enables said computer constituting said information delivery server to execute:

deleting guidance data for an intersection if said guidance data created by said guidance data creating section does not contain a left/right turn guidance pattern as guidance for the path through said intersection.

* * * * *